US007514503B2

(12) United States Patent
Nakamichi et al.

(10) Patent No.: US 7,514,503 B2
(45) Date of Patent: Apr. 7, 2009

(54) MOLDED ARTICLE PRODUCED FROM ALIPHATIC POLYESTER RESIN COMPOSITION

(75) Inventors: Motonori Nakamichi, Yokohama (JP); Tetsuo Ueno, Yokosuka (JP); Jun Yonezawa, Yokosuka (JP); Eiko Kobayashi, Sodegaura (JP); Kazuaki Saito, Chigasaki (JP); Takaaki Matsuda, Fujisawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 520 days.

(21) Appl. No.: 10/959,178

(22) Filed: Oct. 7, 2004

(65) Prior Publication Data

US 2005/0154148 A1 Jul. 14, 2005

(30) Foreign Application Priority Data

Oct. 8, 2003 (JP) .............................. 2003-349378

(51) Int. Cl.
*C08L 67/00* (2006.01)
*C08L 67/04* (2006.01)

(52) U.S. Cl. ........................ 525/165; 525/169; 525/170; 525/172; 525/175; 525/176; 525/450; 524/314; 524/556; 523/124

(58) Field of Classification Search .................. 525/165
See application file for complete search history.

(56) References Cited

U.S. PATENT DOCUMENTS

| 4,419,487 | A | * | 12/1983 | Rowe | ........................... 525/38 |
| 4,585,826 | A | * | 4/1986 | Graves | ........................ 524/534 |
| 5,115,035 | A | * | 5/1992 | Shiraki et al. | ................ 525/314 |
| 5,215,608 | A | * | 6/1993 | Stroud et al. | .................. 156/64 |
| 5,264,503 | A | * | 11/1993 | Marx | .......................... 525/530 |
| 5,332,784 | A | * | 7/1994 | Shiraki et al. | ................. 525/98 |
| 5,686,540 | A | * | 11/1997 | Kakizawa | .................... 525/444 |
| 5,843,573 | A | * | 12/1998 | Itoh et al. | .................... 428/364 |
| 6,235,825 | B1 | * | 5/2001 | Yoshida et al. | .............. 524/314 |
| 6,346,292 | B1 | * | 2/2002 | Grubb et al. | ................. 427/195 |
| 6,544,607 | B1 | * | 4/2003 | Kuroki et al. | ............... 428/35.2 |
| 6,756,331 | B2 | * | 6/2004 | Kasemura et al. | ........... 442/327 |
| 6,875,812 | B1 | * | 4/2005 | Akiyama et al. | .............. 525/98 |
| 2002/0128344 | A1 | * | 9/2002 | Fujihira et al. | .............. 522/162 |

FOREIGN PATENT DOCUMENTS

| JP | 9-316310 | 12/1997 |
| JP | 2000-95898 | 4/2000 |
| JP | 2000-219803 | 8/2000 |
| JP | 2001-288228 | 10/2001 |
| JP | 2002-37987 | 2/2002 |

* cited by examiner

*Primary Examiner*—Randy Gulakowski
*Assistant Examiner*—John J Figueroa
(74) *Attorney, Agent, or Firm*—Finnegan, Henderson, Farabow, Garrett & Dunner, L.L.P.

(57) ABSTRACT

The present invention provides a molded article obtained from an aliphatic polyester resin composition comprising 60 to 99.9 parts by weight of at least one aliphatic polyester (A) and 0.1 to 40 parts by weight of at least one elastic polymer (B), provided that the total amount of the components (A) and (B) is 100 parts by weight, wherein the aliphatic polyester component in the molded article has an enthalpy of crystal fusion $\Delta H$ determined using a differential scanning calorimeter of 5 J/g or more, the molded article has a continuous phase composed of the aliphatic polyester (A) and dispersed phases composed of the elastic polymer (B), and the distance T between the walls of the dispersed phases is less than 5.0 μm.

21 Claims, 3 Drawing Sheets

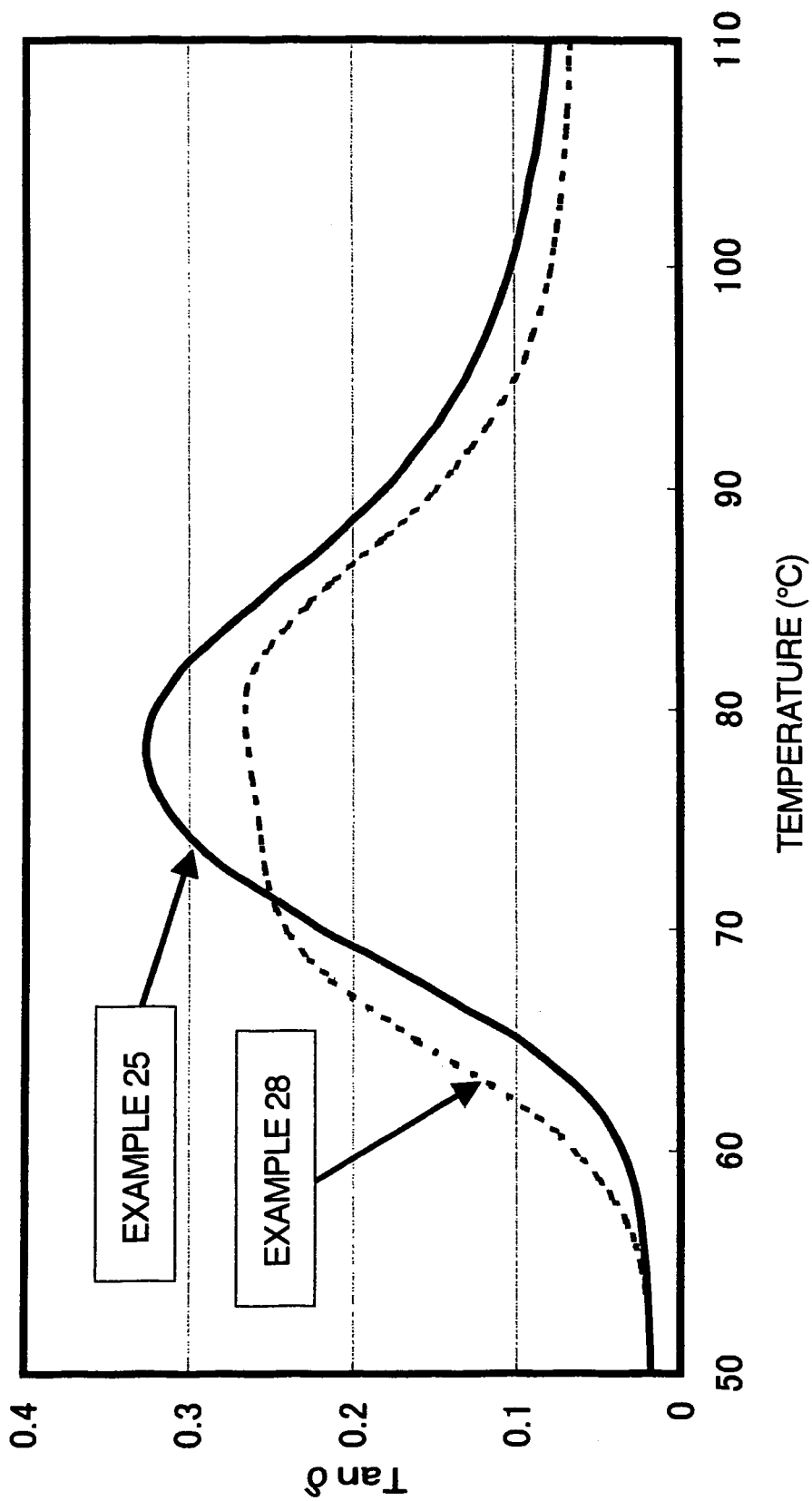

MOLDED ARTICLE PRODUCED FROM ALIPHATIC POLYESTER RESIN COMPOSITION

BACKGROUND OF THE INVENTION

The present invention relates to an aliphatic polyester resin composition with improved impact resistance, a molded article obtained from the composition, and methods for producing these. The molded article of the present invention has excellent impact resistance. The molded article can be molded into various shapes by various methods, and can be used as a film, sheet, injection-molded article, blow-molded article, extrusion-molded article, vacuum pneumatically molded article, laminate, container, foam, fiber, woven fabric, and nonwoven fabric in the fields of automobiles, electrics and electronics, packaging, agriculture, fishery, medical care, and other miscellaneous applications. The molded article can be used as interior and exterior parts such as a bumper, radiator grill, side mall, garnish, wheel cover, aeropart, instrument panel, door trim, sheet fabric, door handle, and floor mat in the field of automobiles. The molded article can be used as a housing or LCD front cover for electronic equipment and electrical household appliance such as a mobile phone and a personal computer in the field of consumer electronics and electronics; it can be used as a film or sheet for packaging in various manners in the field of packaging; and it can be used as a material for medical care in the field of medical care.

PRIOR ART

In recent years, plastic materials originating from plant resources are expected to become widespread in place of conventional plastic materials originating from fossil resources, because of an increased interest in controlling the emission of carbon dioxide caused by global warming. In particular, many studies have been made to practically use aliphatic polyester. Aliphatic polyester is represented by polylactic acid. Polylactic acid exhibits a high rigidity etc., but has drawbacks such as low impact resistance due to brittleness and low heat resistance. Therefore, in order to use polylactic acid widely in place of conventional plastics originating from fossil resources, a technology has been desired for removing these characteristic drawbacks. Specifically, when polylactic acid is to be used as a formed product, there is a strong desire to improve its impact resistance.

Conventionally, in order to modify polylactic acid, many blends such as a blend of glycol or polycaprolactone having a low glass transition temperature with aliphatic polyester originating from aliphatic dibasic acid have been studied. These blends are expected to have flexibility while maintaining biodegradability as one of the characteristics of polylactic acid, but they do not have sufficiently improved impact resistance.

A blend of a thermoplastic resin or the like with a conjugated diene polymer for improving impact resistance of the thermoplastic resin or the like has been known generally. As a blend of polylactic acid with such a conjugated diene copolymer, a resin composition of polylactic acid and an epoxidized diene block copolymer has been known, for example (see JP-A-2000-219803, for example). However, since polylactic acid is required to be blended with a large amount of a soft component to improve its impact resistance in such a technology, a more effective technology for providing polylactic acid with impact resistance has been sought. A system in which polylactic acid is mixed with ethylene-propylene-diene rubber (EPDM) has also been disclosed (see JP-A-2002-37987, for example). This system, in which polylactic acid is simply mixed with EPDM or is crosslinked with EPDM using a radical reaction initiator, exhibits insufficiently improved impact resistance.

SUMMARY OF THE INVENTION

An object of the present invention is to provide a novel molded article in which an aliphatic polyester resin is provided with impact resistance.

In order to achieve the above object, the present inventors have made studies on a molded article containing aliphatic polyester and an elastic polymer. As a result, the inventors have found that a molded article exhibits high impact resistance when the elastic polymer forms dispersed phases in the aliphatic polyester as a matrix, the degree of crystallization of the matrix is within a certain range, and the distance between the walls of the dispersed phases is a certain length or shorter. This finding has led to the completion of the present invention.

It is generally known that, when a resin fractured in a brittle manner is reinforced with an elastic polymer, the distance between the walls of the dispersed phases of the elastic polymer is a main factor in controlling impact resistance. This is because the stress concentrated on the equatorial plane of the dispersed phases causes craze generation and shearing yield in the matrix resin, which makes ductile plastic deformation possible. The smaller the distance between the walls, the more probable the craze generation and shearing yield caused by the stress concentration. The distance between the walls can be easily made smaller by increasing the amount of the elastic polymer added, whereby the target distance between the walls can be achieved. When the dispersed phases are formed by melt-kneading, for example, the distance between the walls can be made smaller by increasing the shearing force caused by kneading. However, these techniques for making the distance between the walls smaller have problems caused by the addition of a large amount of the elastic polymer such as deterioration of mechanical properties such as rigidity, worsened productivity, and the physical limitation to the kneading force. The present inventors have been successful in obtaining a molded article exhibiting excellent impact resistance while utilizing a smaller amount of the elastic polymer added and an economic melt-kneading method by controlling the crystallization state of the matrix. According to the aliphatic polyester resin composition, the molded article obtained from the composition, and the methods for producing these of the present invention, a molded article of an aliphatic polyester resin composition exhibiting excellent impact resistance can be obtained, and the aliphatic polyester resin can be widely applied to various molded products.

Specifically, the present invention has the following aspects.

[1] A molded article obtained from an aliphatic polyester resin composition comprising 60 to 99.9 parts by weight of at least one aliphatic polyester (A) and 0.1 to 40 parts by weight of at least one elastic polymer (B), provided that the total amount of the components (A) and (B) is 100 parts by weight, wherein the aliphatic polyester component in the molded article has an enthalpy of crystal fusion $\Delta H$ determined using a differential scanning calorimeter of 5 J/g or more, the molded article has a continuous phase composed of the aliphatic polyester (A) and dispersed phases composed of the elastic polymer (B), and the distance $\tau$ between the walls of the dispersed phases is less than 5.0 μm.

[2] The molded article as described in [1], wherein the aliphatic polyester component in the molded article has an enthalpy of crystal fusion ΔH determined using a differential scanning calorimeter of 25 J/g or more.

[3] The molded article as described in [1], wherein the aliphatic polyester (A) is a polylactic acid resin.

[4] The molded article as described in [1], wherein the aliphatic polyester (A) is a polylactic acid resin, and the relation between the L-lactic acid unit and the D-lactic acid unit in the polylactic acid resin satisfies the following formula (1) or (2):

[Weight of L-lactic acid unit/(weight of L-lactic acid unit+weight of D-lactic acid unit)]×100>96 wt %     (1) or

[Weight of D-lactic acid unit/(weight of L-lactic acid unit+weight of D-lactic acid unit)]×100>96 wt %     (2).

[5] The molded article as described in [1], comprising 0.01 to 50 parts by weight of at least one crystal nucleator (C) based on 100 parts by weight of the aliphatic polyester (A) and the elastic polymer (B) in total.

[6] The molded article as described in [5], wherein the crystal nucleator (C) has an average particle size of 0.001 to 3.0 μm and a specific surface area of 15 to 1,000 m$^2$/g.

[7] The molded article as described in [5], comprising 0.01 to 50 parts by weight of at least one hydrolysis inhibitor (D) based on 100 parts by weight of the aliphatic polyester (A) and the elastic polymer (B) in total.

[8] The molded article as described in [7], wherein the hydrolysis inhibitor (D) is a polycarbodiimide compound.

[9] The molded article as described in [1], wherein, in the crystal fusion behavior based on the aliphatic polyester (A), the relation between the enthalpy of fusion ΔH1 at a peak temperature T1 or higher and the entire enthalpy of crystal fusion ΔH satisfies the following formula (3):

$\Delta H1/\Delta H < 0.40$     (3).

[10] The molded article as described in [1], wherein the relation between Tan δ at 80° C. and Tan δ at 65° C. satisfies the following formula (4):

Tan δ(80)/Tan δ(65)>1.00     (4), wherein Tan δ (80) refers to Tan δ at 80° C. of the molded article, and Tan δ (65) refers to Tan δ at 65° C. of the molded article.

[11] The molded article as described in [5], wherein the ratio of the Izod impact strength S(300) determined according to ASTM D256 of a test specimen maintained in an atmosphere at a temperature of 60° C. in a humidity of 95% for 300 hours to the Izod impact strength S(0) determined according to ASTM D256 before the maintenance, S(300)/S(0), exceeds 0.4.

[12] A method for producing the molded article as described in [1], comprising melting the aliphatic polyester resin composition at a melting point of the component (A) or higher, and then maintaining the composition at 80 to 130° C. in a cooling process.

[13] An aliphatic polyester resin composition comprising 60 to 99.9 parts by weight of at least one aliphatic polyester (A) and 0.1 to 40 parts by weight of at least one elastic polymer (B), wherein the elastic polymer (B) is selected from the group consisting of (i) an olefin polymer modified by a compound having one or more polar groups selected from the group consisting of an amino group, an imino group, a hydroxyl group, an epoxy group, a carboxyl group, and an acid anhydride group;

(ii) a conjugated diene polymer modified by a compound having one or more polar groups selected from the group consisting of an amino group, an imino group, a hydroxyl group, an epoxy group, a carboxyl group, and an acid anhydride group; and (iii) a mixture of the modified olefin polymer (i) and the modified conjugated diene polymer (ii).

[14] The aliphatic polyester resin composition as described in [13], wherein the aliphatic polyester (A) is a polylactic acid resin.

[15] The aliphatic polyester resin composition as described in [13], wherein the aliphatic polyester (A) is a polylactic acid resin, and the relation between the L-lactic acid unit and the D-lactic acid unit in the polylactic acid resin satisfies the following formula (5) or (6):

[Weight of L-lactic acid unit/(weight of L-lactic acid unit+weight of D-lactic acid unit)]×100>96 wt %     (5) or

[Weight of D-lactic acid unit/(weight of L-lactic acid unit+weight of D-lactic acid unit)]×100>96 wt %     (6).

[16] The aliphatic polyester resin composition as described in [13], wherein the olefin polymer and/or the conjugated diene polymer constituting the elastic polymer (B) have a polymer terminal modified by a compound having one or more polar groups selected from the group consisting of an amino group, an imino group, a hydroxyl group, an epoxy group, a carboxyl group, and an acid anhydride group.

[17] The aliphatic polyester resin composition as described in [13], wherein the elastic polymer (B) comprises at least one polymer selected from the group consisting of a modified conjugated diene homopolymer, a copolymer of a conjugated diene and a vinyl aromatic hydrocarbon, and hydrogenated products of these polymers.

[18] The aliphatic polyester resin composition as described in [13], wherein the elastic polymer (B) comprises a modified block copolymer comprising at least one block mainly composed of a vinyl aromatic hydrocarbon and at least one block mainly composed of a conjugated diene and/or its hydrogenated product, and the composition has a vinyl aromatic hydrocarbon content of 50 wt % or less.

[19] The aliphatic polyester resin composition as described in [13], wherein the elastic polymer (B) is modified by a modifier having an imidazolidinone backbone.

[20] The aliphatic polyester resin composition as described in [13], comprising 0.01 to 50 parts by weight of at least one crystal nucleator (C) based on 100 parts by weight of the aliphatic polyester (A) and the elastic polymer (B) in total.

[21] The aliphatic polyester resin composition as described in [20], wherein the crystal nucleator (C) has an average particle size of 0.001 to 3.0 μm and a specific surface area of 15 to 1,000 m$^2$/g.

[22] The aliphatic polyester resin composition as described in [20], comprising 0.01 to 50 parts by weight of at least one hydrolysis inhibitor (D) based on 100 parts by weight of the aliphatic polyester (A) and the elastic polymer (B) in total.

[23] The aliphatic polyester resin composition as described in [22], wherein the hydrolysis inhibitor (D) is a polycarbodiimide compound.

[24] The aliphatic polyester resin composition as described in [20], wherein the ratio of the Izod impact strength S(300) determined according to ASTM D256 of a test specimen maintained in an atmosphere at a temperature of 60° C. in a humidity of 95% for 300 hours to the Izod impact strength S(0) before the maintenance, S(300)/S(0), exceeds 0.4.

[25] A method for producing the aliphatic polyester resin composition as described in [13], comprising melt-kneading the aliphatic polyester (A) and the elastic polymer (B).

[26] The molded article as described in [1] obtained from the aliphatic polyester resin composition,
wherein the elastic polymer (B) is selected from the group consisting of
(i) an olefin polymer modified by a compound having one or more polar groups selected from the group consisting of an amino group, an imino group, a hydroxyl group, an epoxy group, a carboxyl group, and an acid anhydride group;
(ii) a conjugated diene polymer modified by a compound having one or more polar groups selected from the group consisting of an amino group, an imino group, a hydroxyl group, an epoxy group, a carboxyl group, and an acid anhydride group; and
(iii) a mixture of the modified olefin polymer (i) and the modified conjugated diene polymer (ii).

BRIEF DESCRIPTION OF THE DRAWINGS

FIG. 3 is a schematic view showing the results of measuring Tan $\delta$ in Examples 25 and 28.

BEST MODE FOR CARRYING OUT THE INVENTION

Figure 1:
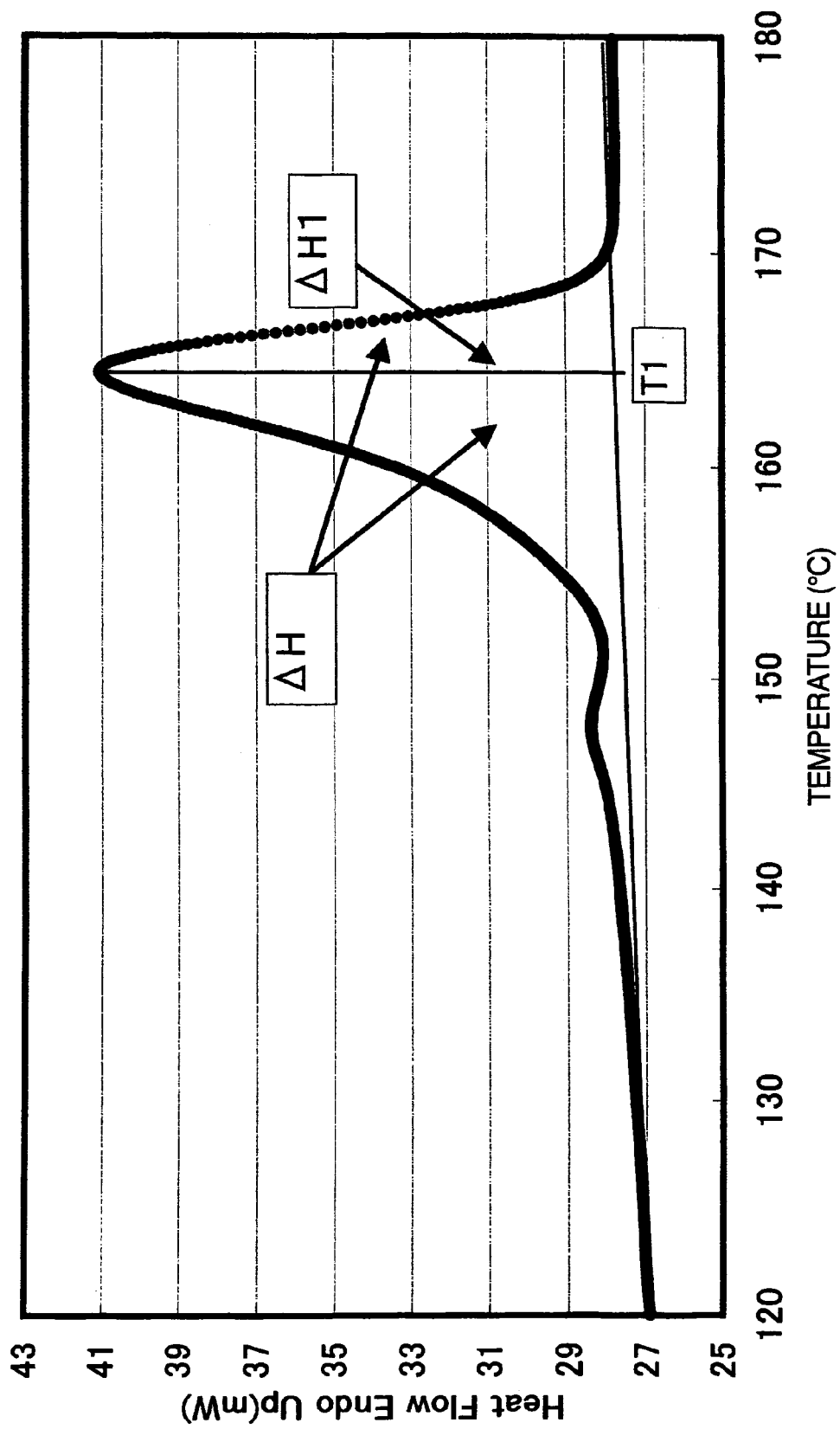
FIG. 1 is a schematic view showing the results of measurement using DSC in Example 22.
Figure 2:
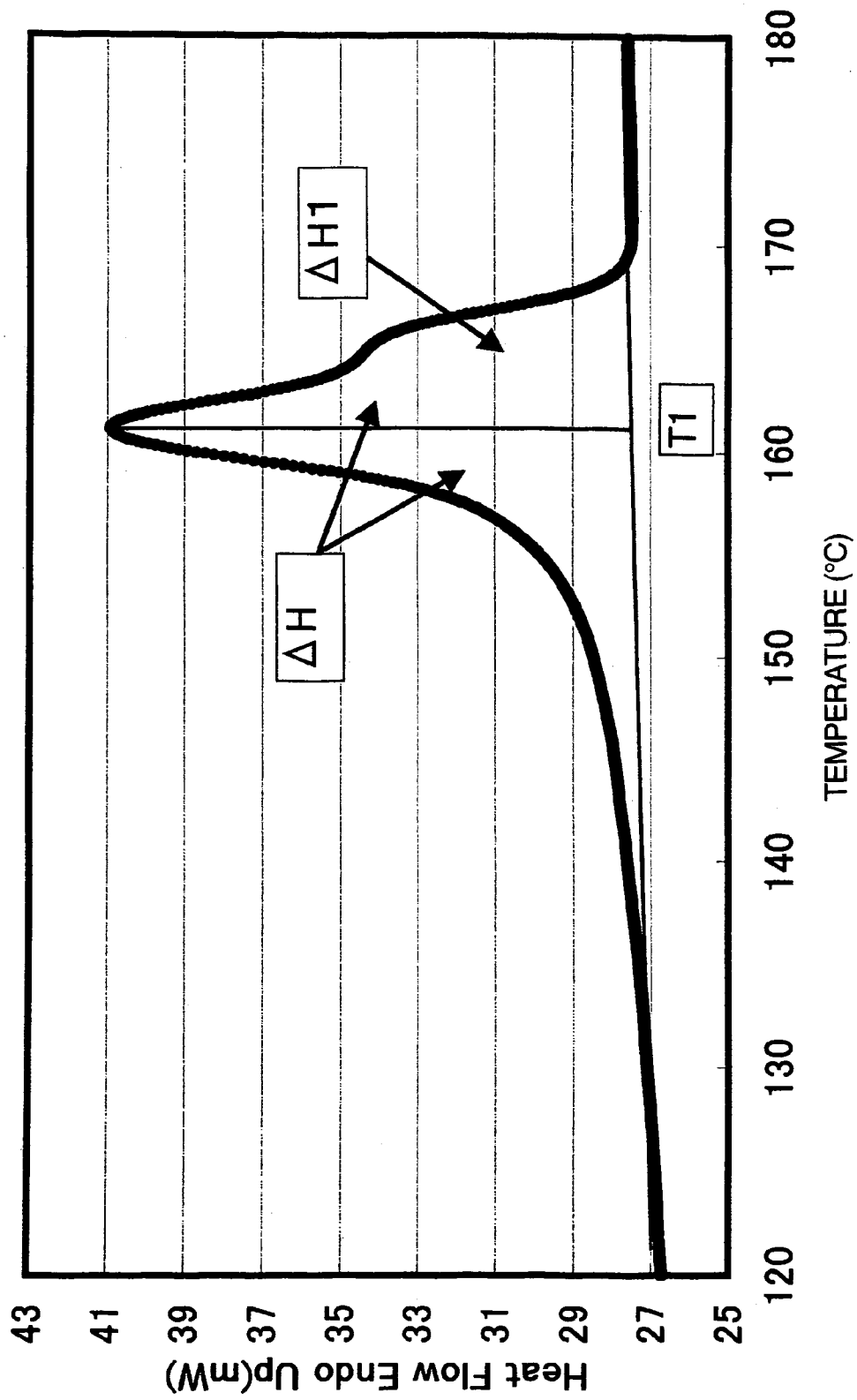
FIG. 2 is a schematic view showing the results of measurement using DSC in Example 24.

The present invention will be specifically described below.
At least one aliphatic polyester (A) used in the present invention is not specifically limited. Examples of the polyester (A) include a polymer having aliphatic hydroxycarboxylic acid as a main constituent and a polymer having an aliphatic polycarboxylic acid and an aliphatic polyhydric alcohol as main constituents. Specific examples of the polymer having an aliphatic hydroxycarboxylic acid as a main constituent include polyglycolic acid, polylactic acid, poly(3-hydroxybutyric acid), poly(4-hydroxybutyric acid), poly(4-hydroxyvaleric acid), poly(3-hydroxyhexanoic acid), and polycaprolactone. Specific examples of the polymer having an aliphatic polycarboxylic acid and an aliphatic polyhydric alcohol as main constituents include polyethylene adipate, polyethylene succinate, polybutylene adipate, and polybutylene succinate. These aliphatic polyesters may be used singly or in a combination of two or more. Of these aliphatic polyesters, a polymer having an aliphatic hydroxycarboxylic acid as a main constituent is preferable. A polylactic acid resin is particularly preferably used. These components (A) may be used singly or in a combination of two or more.

Although the polylactic acid resin is a polymer having L-lactic acid and/or D-lactic acid as main constituents, the resin may contain a copolymer component other than the lactic acids in an amount of 0.1 to 99.9 wt % within the contemplation of the present invention. Examples of such a copolymer component unit include a polycarboxylic acid, a polyhydric alcohol, a hydroxycarboxylic acid, and lactone. Specific examples of such a copolymer component that can be used include polycarboxylic acids such as oxalic acid, malonic acid, succinic acid, glutaric acid, adipic acid, azelaic acid, sebacic acid, dodecanedionic acid, fumaric acid, cyclohexanedicarboxylic acid, terephthalic acid, isophthalic acid, phthalic acid, 2,6-naphthalenedicarboxylic acid, 5-sodiumsulfoisophthalic acid, and 5-tetrabutylphosphoniumsulfoisophthalic acid; polyhydric alcohols such as ethylene glycol, propylene glycol, butanediol, heptanediol, hexanediol, octanediol, nonanediol, decanediol, 1,4-cyclohexanedimethanol, neopentyl glycol, glycerin, trimethylolpropane, pentaerythritol, bisphenol A, an aromatic polyhydric alcohol obtained by adding ethylene oxide to bisphenol, diethylene glycol, triethylene glycol, polyethylene glycol, polypropylene glycol, and polytetramethylene glycol; hydroxy carboxylic acids such as glycolic acid, 3-hydroxybutyric acid, 4-hydroxybutyric acid, 4-hydroxyvaleric acid, 6-hydroxycapronic acid, and hydroxybenzoic acid; and lactones such as glycolide, ε-caprolactone glycolide, ε-caprolactone, β-propyolactone, δ-butyrolactone, β- or γ-butyrolactone, pivarolactone, and δ-valerolactone. These copolymer components may be used singly or in a combination of two or more.

The polylactic acid resin can be produced using a known polymerization method. In particular, polylactic acid can be produced using direct polymerization from lactic acid, ring-opening polymerization utilizing lactide, or the like. The polylactic acid resin in the present invention is a polymer having lactic acids, specifically, an L-lactic acid unit and/or D-lactic acid unit, as main constituents. From the viewpoint of heat resistance, the polylactic acid resin preferably has an L-lactic acid content calculated by the formula, [weight of L-lactic acid unit/(weight of L-lactic acid unit+weight of D-lactic acid unit)]×100, of more than 96 wt % or a D-lactic acid content calculated by the formula, [weight of D-lactic acid unit/(weight of L-lactic acid unit+weight of D-lactic acid unit)]×100, of more than 96 wt %, with such a content being more preferably more than 97 wt %, and particularly preferably more than 98 wt %.

Further, a stereocomplex formed from poly(L-lactic acid) having an L-lactic acid unit as a main constituent and poly (D-lactic acid) having a D-lactic acid unit as a main constituent is preferably used in order to improve crystallinity. The polylactic acid resin is preferably composed of a mixture of 0.1 to 99.9 wt % of poly(L-lactic acid) and 0.1 to 99.9 wt % of poly(D-lactic acid) from the viewpoint of heat resistance.

The polylactic acid resin may be produced by copolymerizing L-lactic acid with D-lactic acid, or copolymerizing lactide with another copolymerizable component. Examples of such a component include a dicarboxylic acid, a polyhydric alcohol, a hydroxycarboxylic acid, and lactone. The polylactic acid resin can be polymerized by a known polymerization method such as direct dehydration condensation or ring-opening polymerization of lactide. The molecular weight of the polylactic acid resin may be increased by using a binder such as polyisocyanate as required.

The weight average molecular weight of the polylactic acid resin is preferably 30,000 to 1,000,000, more preferably 50,000 to 500,000, and most preferably 100,000 to 280,000. The weight average molecular weight is preferably 30,000 or more taking mechanical properties of the composition into consideration, and preferably 1,000,000 or less taking aggravation of processability due to an increase in the melt viscosity into consideration.

The content of the aliphatic polyester (A) in the aliphatic polyester resin composition of the present invention is 60 to 99.9 parts by weight, preferably 70 to 99.9 parts by weight, more preferably 80 to 99.9 parts by weight, and particularly preferably 85 to 99.9 parts by weight based on 100 parts by weight of the total amount of the aliphatic polyester (A) and the elastic polymer (B). The content of the elastic polymer (B) is 0.1 to 40 parts by weight, preferably 0.1 to 30 parts by weight, more preferably 0.1 to 20 parts by weight, and particularly preferably 0.1 to 15 parts by weight based on 100 parts by weight of the total amount of the aliphatic polyester (A) and the elastic polymer (B). The content of the elastic polymer (B) must be 0.1 part by weight or more taking improvement of impact resistance into consideration, and is 40 parts by weight or less, preferably 30 parts by weight or less, more preferably 20 parts by weight or less, and particularly preferably 15 parts by weight taking the modulus of elasticity and heat resistance into consideration.

One example of at least one elastic polymer (B) used in the present invention is an olefin polymer. Examples include ethylene homopolymers such as LDPE and LLDPE and an ethylene-α-olefin copolymer. A polyolefin elastomer composed of an ethylene-α-olefin copolymer is particularly preferable.

The ethylene-α-olefin copolymer is a copolymer composed of ethylene and $C_3$ to $C_{20}$ α-olefin, for example, propylene, 1-butene, 1-hexene, or 1-octene. These α-olefins may be used singly or in a combination of two or more. In addition, the copolymer may be copolymerized with a conjugated diene such as 1,3-butadiene or isoprene or a non-conjugated diene such as dicyclopentadiene, 1,4-hexadiene, cyclooctadiene, methylene norbornene, or ethylidene norbornene.

An olefin polymer modified by a compound having one or more polar groups selected from the group consisting of an amino group, an imino group, a hydroxyl group, an epoxy group, a carboxyl group, and an acid anhydride group is preferable from the viewpoint of impact resistance. An amino group or an imino group is particularly preferable as a polar group. Impact resistance of the polylactic acid resin is remarkably improved by the bonding of such a polar atomic group. As a method of modifying these olefin polymers using a compound having one or more polar groups selected from the group consisting of an amino group, an imino group, a hydroxyl group, an epoxy group, a carboxyl group, and an acid anhydride group, a known method such as a method of adding an unsaturated compound having a polar group to the polymer chain using a radical initiator or the like or a method of copolymerizing a monomer having a polar group with ethylene or the like may be used.

A conjugated diene polymer as another example of the elastic polymer (B) is a conjugated diene homopolymer, a copolymer of a conjugated diene and a vinyl aromatic compound, or hydrogenated products of these polymers. As the conjugate diene for the polymers, 1,3-butadiene, 2-methyl-1,3-butadiene (isoprene), 2,3-dimethyl-1,3-butadiene, 1,3-pentadiene, 1,3-hexadiene, and the like can be used singly or in a combination of two or more. In general, 1,3-butadiene, isoprene, or a combination of these is preferable.

As the vinyl aromatic compound, styrene, o-methylstyrene, p-methylstyrene, p-t-butylstyrene, 1,3-dimethylstyrene, α-methylstyrene, vinylnaphthalene, vinylanthracene, and the like can be used singly or in a combination of two or more. In general, styrene is preferable. The content of the vinyl aromatic compound in the copolymer is 50 wt % or less, preferably 40 wt % or less, more preferably 30 wt % or less, and most preferably 25 wt % or less. The content is preferably 50 wt % or less taking the effect of providing the composition with impact resistance into consideration. Both units may form a random copolymer, a block copolymer, or a copolymer comprising randomly copolymerized blocks. Preferably, the copolymer is a block copolymer composed of at least one polymer block A having a vinyl aromatic compound as a main constituent and at least one polymer block B having a conjugated diene as a main constituent, or its hydrogenated product, for example. More preferably, the copolymer is a block copolymer composed of at least one polymer block A having a vinyl aromatic compound as a main constituent and one polymer block B having a conjugated diene as a main constituent.

Examples of the method for producing the block copolymer used in the present invention include methods described in JP-B-36-19286, JP-B-43-17979, JP-B-46-32415, JP-B-49-36957, JP-B-48-2423, JP-B-48-4106, JP-B-56-28925, JP-B-51-49567, JP-A-59-166518, and JP-A-60-186577. The block copolymer obtained by these methods has a structure, for example, represented by the following formula (a structure before hydrogenation in the case of a hydrogenated copolymer):

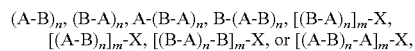

wherein A is a polymer block having a vinyl aromatic compound as a main constituent, B is a polymer block having a conjugated diene as a main constituent, X represents a residue of a coupling agent or a residue of an initiator such as a polyfunctional organolithium compound, n is an integer of 1 or more, and generally an integer of 1 to 5, and m is an integer of 2 or more, and generally an integer of 2 to 10.

In the above description, the polymer block A having a vinyl aromatic hydrocarbon as a main constituent refers to a copolymer block of a vinyl aromatic compound and a conjugated diene containing a vinyl aromatic compound in an amount of preferably 50 wt % or more, and more preferably 70 wt % or more and/or a vinyl aromatic compound homopolymer block, and the polymer block B having a conjugated diene as a main constituent refers to a copolymer block of a conjugated diene and a vinyl aromatic compound containing a conjugated diene in an amount of preferably more than 50 wt %, and more preferably 60 wt % or more and/or a conjugated diene homopolymer block. The vinyl aromatic compound in the copolymer block may be distributed homogeneously or as taper-shaped. In the copolymer block, two or more parts in which a vinyl aromatic compound is distributed homogeneously and/or two or more parts in which a vinyl aromatic compound is distributed as taper-shaped may be present together.

In the present invention, the hydrogenated conjugated diene polymer can be obtained by hydrogenating a conjugated diene polymer (block copolymer obtained as above in the case of a block copolymer). There are no specific limitations to the hydrogenation catalyst used for hydrogenation. (1) A supported heterogeneous catalyst in which a metal such as Ni, Pt, Pd, or Ru is supported on carbon, silica, alumina, diatomite, or the like; (2) a so-called Ziegler hydrogenation catalyst using transition metal salt such as an organic acid salt or acetylacetone salt of Ni, Co, Fe, Cr, or the like and a reducing agent such as an organoaluminum; and (3) a homogeneous hydrogenation catalyst such as an organometal compound (so-called organometal complex) of Ti, Ru, Rh, Zr, or the like that have been conventionally known are used. Specific examples of the hydrogenation catalyst that can be used are described in JP-B-42-8704, JP-B-43-6636, JP-B-63-4841, JP-B-1-37970, JP-B-1-53851, and JP-B-2-9041. As a preferable hydrogenation catalyst, a titanocene compound and/or a mixture of the compound and a reducing organometal compound can be given.

In the hydrogenated conjugated diene polymer used in the present invention, the hydrogenation rate in the unsaturated double bonds based on the conjugated diene can be arbitrarily selected depending on the object without specific limitations. When a hydrogenated vinyl aromatic hydrocarbon elastomer exhibiting good heat stability and weather resistance is to be obtained, more than 70%, preferably 75% or more, further preferably 85% or more, and particularly preferably 90% or more of the unsaturated double bonds based on the conjugated diene compound in the polymer are recommended to be hydrogenated. There are no specific limitations to the hydrogenation rate in the aromatic double bonds based on the vinyl aromatic hydrocarbon in the copolymer.

The weight average molecular weight of the conjugated diene polymer used in the present invention is preferably 30,000 or more from the viewpoint of the effect of improving impact resistance on the composition and 1,000,000 or less from the viewpoint of processability, more preferably 60,000 to 800,000, and still more preferably 70,000 to 600,000. The weight average molecular weight can be determined using gel permeation chromatography (GPC) by measuring the peak molecular weight in the chromatogram using a calibration curve determined from measurement for commercially available standard polystyrene (prepared using the peak molecular weight of standard polystyrene).

When the conjugated diene polymer is a block copolymer, the content of the vinyl aromatic compound homopolymer block can be determined by measuring the amount of the vinyl aromatic hydrocarbon homopolymer block component (provided that the component with a degree of polymerization of 30 or less is excluded), obtained by decomposing the block copolymer before hydrogenation by a method of oxidation decomposition using di-t-butyl hydroperoxide in the presence of osmium tetroxide as a catalyst (I. M. Kolthoff et al., J. Polym. Sci., 1, 429 (1946)), using an UV spectrophotometer or the like.

The conjugated diene polymer used in the present invention is preferably a conjugated diene polymer modified by a compound having one or more polar groups selected from the group consisting of an amino group, an imino group, a hydroxyl group, an epoxy group, a carboxyl group, and an acid anhydride group (hereinafter referred to as a "modified conjugated diene polymer").

In particular, a conjugated diene polymer characterized in that the polymer terminal is modified by a compound having one or more polar groups selected from the group consisting of an amino group, an imino group, a hydroxyl group, an epoxy group, a carboxyl group, and an acid anhydride group is preferable from the viewpoint of impact resistance. If the main chain is modified, a functional group might be reacted with both terminals of the aliphatic polyester to cause gelation, making it impossible for the composition to be used as a molding material.

In the present invention, a conjugated diene homopolymer, a copolymer of a conjugated diene and a vinyl aromatic compound, or hydrogenated products of these polymers, in which the polymer terminal is modified by a compound having one or more polar groups selected from the group consisting of an amino group, an imino group, a hydroxyl group, an epoxy group, a carboxyl group, and an acid anhydride group, can be preferably used. These polymers may be used in a combination of two or more.

An amino group or an imino group is particularly preferable as a polar group. In the present invention, the amino group refers to a polar group constituting a primary amine, a secondary amine, or a tertiary amine. In the present invention, the imino group refers to a group in which a nitrogen atom is bonded to the same carbon atom via a double bond, specifically, =NH.

Impact resistance of the polylactic acid resin is remarkably improved by bonding of such a polar atomic group.

The modified conjugated diene polymer can be produced, as in the case of the olefin polymer, using a known method such as the addition of a compound having a polar group using a radical initiator, or capping of the anionically polymerizable terminal with a compound having a polar group. This polymer can be produced according to the description and cited documents in JP-A-8-3250, JP-A-10-182925, JP-A-2002-201333, JP-A-2002-317024, and JP-A-2003-113202, for example.

As a method of capping with a compound having a polar group, a method of reacting the active terminal of the conjugated diene polymer with a modifier to which an atomic group having a functional group is bonded or a modifier to which an atomic group with a functional group protected by a known method is bonded can be given. It is possible that, depending on the type of the modifier, a hydroxyl group or an amino group might turn into an organometal salt when reacted with the modifier. In this case, the salt can be converted to a hydroxyl group or amino group by treating with water or a compound having active hydrogen such as an alcohol.

In the modified conjugated diene polymer, at least one compound having a polar group is preferably bonded to one polymer chain. Examples of the polymer include a modified conjugated diene polymer in which a compound having a polar group is bonded to the terminal of one polymer chain. In the modified conjugated diene polymer, an unmodified conjugated diene polymer may be present in a mixture. The percentage of the unmodified conjugated diene polymer present in the modified conjugated diene polymer in a mixture is preferably 70 wt % or less, more preferably 60 wt % or less, and still more preferably 50 wt % or less.

In the present invention, when the elastic polymer modified by a compound having one or more polar groups selected from the group consisting of an amino group, an imino group, a hydroxyl group, an epoxy group, a carboxyl group, and an acid anhydride group is used, the amount of the polar groups is preferably 0.00001 to 30 wt %, more preferably 0.00001 to less than 5 wt %, and particularly preferably 0.00001 to 1 wt %.

In the present invention, given as the atomic group having at least one functional group selected from the group consisting of a hydroxyl group, an epoxy group, an amino group, a silanol group, and an alkoxysilane that can be used for obtaining a conjugated diene copolymer modified by a compound having one or more polar groups selected from the group consisting of an amino group, an imino group, a hydroxyl group, an epoxy group, a carboxyl group, and an acid anhydride group is an atomic group having the following formula:

[Formula 1]

(1) $-NR^9-R^{10}-OH$ (2) $-N[R^{10}-OH]_2$ (3) $-NR^9-R^{10}-Si(OR^{11})_3$ (4) $-N[R^{10}-Si(OR^{11})_3]_2$ (5) $-NH^9-R^{10}-CH\overset{O}{\underset{\diagdown\diagup}{-}}CHR^{11}$ (6) $-N[R^{10}-CH\overset{O}{\underset{\diagdown\diagup}{-}}CHR^{11}]_2$ (7) $-CR^9-R^{10}-NR^{11}R^{12}$
    $\quad\;\;|$
    $\;\;\,OH$ (8) $-CR^9-R^{10}-OR^{11}$
    $\quad\;\;|$
    $\;\;\,OH$ -continued (9) $\quad$—$CR^9$—$R^{10}$—$Si(OR^{11})_3$
       $\quad\quad\quad|$
       $\quad\quad\quad OH$

(10) $\quad$—$O$—$R^{10}$—$Si(OR^{11})_3$

(11) $\quad$—$C$—$NR^9$—$R^{10}$—$NR^{11}R^{12}$
       $\quad\quad\|$
       $\quad\quad O$

(12) $\quad$—$C$—$R^{10}$—$NR^{11}R^{12}$
       $\quad\quad\|$
       $\quad\quad O$

(13) $\quad$—$CR^9$—$NR^{11}$—$R^{10}$—$NR^{13}R^{14}$
       $\quad\quad\quad|$
       $\quad\quad\quad OH$

(14) $\quad$—$CR^9$—$R^{10}$—$NR^{11}R^{12}$
       $\quad\quad\quad|$
       $\quad\quad\quad OH$ wherein $R^9$ and $R^{12}$ to $R^{14}$ are independently hydrogen, a $C_1$ to $C_{24}$ hydrocarbon group, or a $C_1$ to $C_{24}$ hydrocarbon group having at least one functional group selected from the group consisting of a hydroxyl group, an epoxy group, a silanol group, and an alkoxysilane; $R^{10}$ is a $C_1$ to $C_{30}$ hydrocarbon chain or a $C_1$ to $C_{30}$ hydrocarbon chain having at least one functional group selected from the group consisting of a hydroxyl group, an epoxy group, a silanol group, and an alkoxysilane; provided that an element such as oxygen, nitrogen, or silicon may be bonded to the hydrocarbon group of $R^9$ and $R^{12}$ to $R^{14}$ and the hydrocarbon chain of $R^{10}$ in a bonding manner other than a hydroxyl group, an epoxy group, a silanol group, and an alkoxysilane; and $R^{11}$ is hydrogen or a $C_1$ to $C_8$ alkyl group.

In the present invention, examples of the modifier used for obtaining a conjugated diene polymer, to which at least one atomic group having at least one functional group selected from the group consisting of a hydroxyl group, an epoxy group, an amino group, a silanol group, and an alkoxysilane is bonded, that can be used for obtaining a conjugated diene copolymer modified by a compound having one or more polar groups selected from the group consisting of an amino group, an imino group, a hydroxyl group, an epoxy group, a carboxyl group, and an acid anhydride group include the following modifiers.

Specifically, examples include tetraglycidylmetaxylenediamine, tetraglycidyl-1,3-bisaminomethylcyclohexane, tetraglycidyl-p-phenylenediamine, tetraglycidyldiaminodiphenylmethane, diglycidylaniline, diglycidyl-o-toluidine, γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, and γ-glycidoxypropyltributoxysilane.

Other examples include γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, and γ-glycidoxypropyldimethylethoxysilane.

Further Examples include γ-glycidoxypropyldimethylphenoxysilane, γ-glycidoxypropyldiethylmethoxysilane, γ-glycidoxypropylmethyldiisopropenoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, and bis(γ-glycidoxypropyl)methylethoxysilane.

Further examples include bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyltrimethoxysilane, and β-(3,4-epoxycyclohexyl)ethyltriethoxysilane.

Further examples include β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, β-(3,4-epoxycyclohexyl)propyltrimethoxysilane, β-(3,4-epoxycyclohexyl)ethylmethyldimethoxysilane, β-(3,4-epoxycyclohexyl)ethylethyldimethoxysilane, β-(3,4-epoxycyclohexyl)ethylethyldiethoxysilane, β-(3,4-epoxycyclohexyl)ethylmethyldiethoxysilane, β-(3,4-epoxycyclohexyl)ethylmethyldipropoxysilane, and β-(3,4-epoxycyclohexyl)ethylmethyldibutoxysilane.

Further examples include β-(3,4-epoxycyclohexyl)ethylmethyldiphenoxysilane, β-(3,4-epoxycyclohexyl)ethyldimethylmethoxysilane, β-(3,4-epoxycyclohexyl)ethyldiethylethoxysilane, β-(3,4-epoxycyclohexyl)ethyldimethylethoxysilane, β-(3,4-epoxycyclohexyl)ethyldimethylpropoxysilane, β-(3,4-epoxycyclohexyl)ethyldimethylbutoxysilane, β-(3,4-epoxycyclohexyl)ethyldimethylphenoxysilane, β-(3,4-epoxycyclohexyl)ethyldiethylmethoxysilane, β-(3,4-epoxycyclohexyl)ethylmethyldiisopropenoxysilane, 1,3-dimethyl-2-imidazolidinone, 1,3-diethyl-2-imidazolidinone, N,N'-dimethylpropyleneurea, N-methylpyrrolidone, and N-(1,3-dimethylbutylidene)-3-(triethoxysilyl)-1-propaneamine. Of these, modifiers having an imidazolidinone backbone, 1,3-dimethyl-2-imidazolidinone and 1,3-diethyl-2-imidazolidinone are particularly preferred.

By reacting the above modifier, a conjugated diene polymer (polymer block A and/or polymer block B in the case of the block copolymer) to which at least one residue of the modifier, with an atomic group having at least one functional group selected from the group consisting of a hydroxyl group, an epoxy group, an amino group, an imino group, a silanol group, and an alkoxysilane bonded thereto, is bonded, or its hydrogenated product can be obtained. Although there are no specific limitations to the position in which a modifier residue is bonded to the modified block copolymer, the residue is preferably bonded to the polymer block A in order to obtain a composition exhibiting excellent physical properties at a high temperature.

In the present invention, as a method for obtaining a conjugated diene polymer modified by a carboxyl group and/or an acid anhydride group, a method of reacting a modifier having a carboxyl group and/or a modifier having an acid anhydride group with the above-described conjugated diene polymer to which at least one atomic group having one or more polar groups selected from the group consisting of a hydroxyl group, an amino group, an imino group, an epoxy group, a silanol group, and an alkoxysilane is bonded, can be given.

Specific examples of the modifier having a carboxyl group include aliphatic carboxylic acids such as maleic acid, oxalic acid, succinic acid, adipic acid, azelaic acid, sebacic acid, dodecanedicarboxylic acid, carbaryl acid, cyclohexanedicarboxylic acid, and cyclopentanedicarboxylic acid; and aromatic carboxylic acids such as terephthalic acid, isophthalic acid, o-phthalic acid, naphthalenedicarboxylic acid, biphenyldicarboxylic acid, trimesic acid, trimellitic acid, and pyromellitic acid.

Specific examples of the modifier having an acid anhydride group include maleic anhydride, itaconic anhydride, pyromellitic anhydride, cis-4-cyclohexane-1,2-dicarboxylic anhydride, 1,2,4,5-benzenetetracarboxylic dianhydride, and 5-(2, 5-dioxytetrahydroxyfuryl)-3-methyl-3-cyclohexene-1,2-dicarboxylic anhydride.

As another method for obtaining a conjugated diene polymer modified by a carboxyl group and/or an acid anhydride group, a method of graft modification of the conjugated diene polymer using an α,β-unsaturated carboxylic acid or its derivative, for example, its anhydride, ester, amide, or imide can be given. Specific examples of the α,β-unsaturated carboxylic acid or its derivative include maleic anhydride, maleic anhydride imide, acrylic acid or its ester, methacrylic acid or its ester, and endo-cis-bicyclo[2.2.1]-5-heptene-2,3-dicarboxylic acid or its anhydride. The amount of the α,β-unsaturated carboxylic acid or its derivative added is generally 0.01 to 20 parts by weight, and preferably 0.1 to 10 parts by weight based on 100 parts by weight of the conjugated diene polymer.

In the molded article of the present invention, the enthalpy of crystal fusion ΔH of the aliphatic polyester component in the molded product determined using a differential scanning calorimeter (DSC) is 5 J/g or more, preferably 25 J/g or more, and more preferably 30 J/g or more. ΔH of the molded article can be determined by differential scanning calorimetry (DSC). If ΔH is less than 5 J/g, the molded article exhibits inferior impact resistance.

Examples of the method for making ΔH of the molded article 5 J/g or more include a method of heating comprising melting the aliphatic polyester resin composition at a melting point of the component (A) or higher, and then maintaining the composition at a temperature which is a glass transition temperature of the component (A) or higher and a temperature lower than the melting point of the component (A) in a cooling process; and a method of placing the molded article solidified by cooling in an atmosphere at a temperature which is a glass transition temperature of the component (A) or higher and a temperature lower than a melting point of the component (A) for a prescribed period of time. A method of heating comprising melting the composition at a melting point of the component (A) or higher, and then maintaining the composition at a temperature which is a glass transition temperature of the component (A) or higher and a temperature lower than the melting point of the component (A) in a cooling process is preferable from the viewpoint of processability. The temperature to be maintained is preferably 60 to 160° C., more preferably 80 to 130° C., and particularly preferably 90 to 120° C. If less than 60° C., a long period of time is required to obtain the molded article having the target ΔH, which is not preferable from the viewpoint of moldability. If more than 160° C., a long period of time is required to solidify the molded article, which is not preferable again from the viewpoint of moldability.

In the present invention, in the crystal fusion curve of the aliphatic polyester (A) in the molded article of the composition composed of the aliphatic polyester (A) and elastic polymer (B), the relation between the enthalpy of fusion ΔH1 at a peak temperature T1 or higher and the entire enthalpy of fusion ΔH preferably satisfies the following formula:

ΔH1/ΔH<0.40.

ΔH1/ΔH is preferably less than 0.40 from the viewpoint of impact resistance and heat resistance of the molded article, more preferably 0.38 or less, and particularly preferably 0.36 or less.

ΔH1 and ΔH of the molded article can be determined using differential scanning calorimetry (DSC). Examples of the method for obtaining the molded article of the present invention with satisfactory ΔH and ΔH1/ΔH include injection molding in which the resin composition of the present invention is heated by supplying the composition to a cylinder set at a melting point of the component (A) or higher, melting the composition, and then holding the composition in a die set at a temperature which is a glass transition temperature of the component (A) or higher and a temperature lower than the melting point of the component (A). The molded article of the present invention can also be obtained by taking a molded article out of a die and placing the molded article in an atmosphere at a temperature which is a glass transition temperature of the component (A) or higher and a temperature lower than a melting point of the component (A) for a prescribed period of time. Other molding methods may be used for obtaining the molded article of the present invention by optimizing the heating temperature and heating time according to the material in the same manner.

In the molded article of the present invention, the relation between Tan δ at 80° C. and Tan δ at 65° C. preferably satisfies the following formula:

Tan δ(80)/Tan δ(65)>1.00, wherein Tan δ (80) refers to Tan δ at 80° C. of the molded article, and Tan δ (65) refers to Tan δ at 65° C. of the molded article. When Tan δ (80)/Tan δ (65) exceeds 1.00, the molded article exhibits satisfactory impact resistance because the number of tie molecules is sufficient. Tan δ (80)/Tan δ (65) is preferably 1.70 or more, more preferably 1.80 or more, and particularly preferably 2.00 or more. Tan δ can be measured using a dynamic viscoelasticity measuring device. To achieve Tan δ (80)/Tan δ (65) within the scope of the present invention, it is important to solidify the molded article at a high speed when molding. If not solidified at a high speed, it is difficult to form a large number of tie molecules (amorphous molecules bridging crystal lamellae). In order to solidify the molded article at a high speed, a technique such as improvement of optical purity of the polylactic acid resin, introduction of a crystal nucleator, or introduction of the polylactic acid stereocomplex can be used. In addition, the solidifying speed can be increased by setting the die temperature at a relatively low temperature. In this case, it is important to achieve a sufficient degree of crystallization by a technique such as postcrystallization in which the time of holding the molded article in a die is made longer from the viewpoint of impact resistance.

In the present invention, further addition of a crystal nucleator (C) can further improve the effect of providing the molded article with impact resistance exhibited by the component (B). There are no specific limitations to the shape of the crystal nucleator (C). The crystal nucleator may be in the shape of particles, a plate, a whisker, or the like. As a preferable crystal nucleator, a crystal nucleator conventionally used for a polymer can be used without specific limitations. Both an inorganic crystal nucleator and an organic crystal nucleator can be used.

The component (C) is contained preferably in an amount of 1 to 50 parts by weight based on 100 parts by weight of the total amount of the components (A) and (B) from the viewpoint of impact resistance. 1 part by weight or more of the component (C) is preferable because impact resistance is improved due to occurrence of crystallization. 50 parts by weight or less is preferable because impact resistance is not reduced.

Specific examples of the inorganic crystal nucleator include talc, kaolinite, montmorillonite, synthetic mica, clay, zeolite, silica, graphite, carbon black, zinc oxide, magnesium oxide, titanium oxide, calcium sulfide, boron nitride, calcium carbonate, barium sulfate, aluminum oxide, neodium oxide, and metal salt of phenyl phosphonate. These crystal nucleators may have a surface treated with various surface treatment agents such as a titanate coupling agent, silane coupling agent, unsaturated carboxylic acid, and fatty acid and its derivative in order to have improved affinity with the resin and dispersibility.

In the present invention, the crystal nucleator (C) preferably has an average particle size of 0.001 to 3.0 µm and a specific surface area of 15 to 1,000 $m^2/g$. An average particle size of above 3.0 µm or a specific surface area of below 15 $m^2/g$ is not preferable because impact resistance is insufficient. The average particle size in the present invention refers to an average particle size determined from the particle size in the case of a cumulative amount of 50 wt % read from the particle size cumulative distribution curve measured using laser diffraction scattering.

The average particle size is more preferably 0.001 to 2.6 µm, and particularly preferably 0.01 to 1.1 µm. The specific surface area is more preferably 14 to 500 $m^2/g$, and particularly preferably 34 to 500 $m^2/g$.

The amount of the crystal nucleator added is preferably 0.01 to 50 parts by weight, more preferably 0.01 to 30 parts by weight, and still more preferably 0.1 to 30 parts by weight based on 100 parts by weight of the aliphatic polyester resin (A).

Specific examples of the organic crystal nucleator include organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluiate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonates such as sodium p-toluenesulfonate and sodium sulfoisophthalate; and carboxylic amides such as stearic amide, ethylenebislauric amide, palmitic amide, hydroxystearic amide, erucic amide, and trimesic tris(t-butylamide).

Further specific examples include polymers such as low-density polyethylene, high-density polyethylene, polypropylene, polyisopropylene, polybutene, poly-4-methylpentene, poly-3-methylbutene-1, polyvinylcycloalkane, polyvinyltrialkylsilane, and high-melting polylactic acid; sodium salts or potassium salts of a polymer having a carboxyl group (so-called ionomers) such as a sodium salt of an ethylene-acrylic acid or a methacrylic acid copolymer and a sodium salt of a styrene-maleic anhydride copolymer; benzylidene sorbitol and its derivative; phosphorus compound metal salts such as sodium-2,2'-methylenebis(4,6-di-t-butylphenyl) phosphate; and 2,2-methylbis(4,6-di-t-butylphenyl) sodium.

Among the above examples of the crystal nucleator used in the present invention, at least one crystal nucleator selected from the group consisting of talc, kaolin or calcium carbonate, and organic carboxylic acid metal salts is particularly preferred. The crystal nucleator used in the present invention may be used singly or in a combination of two or more.

As the plasticizer used in the present invention, commonly well-known plasticizers can be used. Examples of the plasticizer include a polyester plasticizer, a glycerin plasticizer, a polycarboxylate plasticizer, a phosphate plasticizer, a polyalkylene glycol plasticizer, and an epoxy plasticizer. Specific examples of the polyester plasticizer include polyesters composed of an acid component such as adipic acid, sebacic acid, terephthalic acid, isophthalic acid, naphthalenedicarboxylic acid, or diphenyldicarboxylic acid and a diol component such as propylene glycol, 1,3-butanediol, 1,4-butanediol, 1,6-hexanediol, ethylene glycol, or diethylene glycol; and polyesters composed of a hydroxycarboxylic acid such as polycaprolactone.

These polyesters may be end-capped with monofunctional carboxylic acid, a monofunctional alcohol, an epoxy compound, or the like. Specific examples of the glycerin plasticizer include glycerin monoacetomonolaurate, glycerin diacetomonolaurate, glycerin monoacetomonostearate, glycerin diacetomonooleate, and glycerin monoacetomonomontanate. Specific examples of the polycarboxylate plasticizer include phthalates such as dimethyl phthalate, diethyl phthalate, dibutyl phthalate, dioctyl phthalate, diheptyl phthalate, dibenzyl phthalate, and butylbenzyl phthalate; trimellitates such as tributyl trimellitate, trioctyl trimellitate, and trihexyl trimellitate; adipate such as diisodecyl adipate, n-octyl adiDate. n-decvl adipate; citrates such as triethyl acetylcitrate and tributyl acetylcitrate; azelates such as di-2-ethylhexyl azelate; and sebacates such as dibutyl sebacate and di-2-ethylhexyl sebacate.

Specific examples of the phosphate plasticizer include tributyl phosphate, tri-2-ethylhexyl phosphate, trioctyl phosphate, triphenyl phosphate, diphenyl-2-ethylhexyl phosphate, and tricresyl phosphate. Specific examples of the polyalkylene glycol plasticizer include polyalkylene glycols or their end-capped compounds such as terminal epoxy-modified compounds, terminal ester-modified compounds, and terminal ether-modified compounds such as polyethylene glycol, polypropylene glycol, a poly(ethylene oxide-propylene oxide) block and/or random copolymer, polytetramethylene glycol, an ethylene oxide addition polymer of bisphenol, a propylene oxide addition polymer of bisphenol, and a tetrahydrofuran addition polymer of bisphenol.

The epoxy plasticizer generally refers to an epoxy triglyceride composed of an alkyl epoxystearate and a soybean oil, or the like. In addition, a so-called epoxy resin using bisphenol A and epichlorohydrin as main raw materials can also be used. Specific examples of other plasticizers include aliphatic polyol benzoates such as neopentyl glycol dibenzoate, diethylene glycol dibenzoate, and triethylene glycol di-2-ethyl butyrate; fatty acid amides such as stearic amide; aliphatic carboxylates such as butyl oleate; oxyacid esters such as methyl acetylricinolate and butyl acetylricinolate; pentaerythritol, various sorbitols, polyacrylates, silicone oil, and paraffins.

Among the above-described examples of the plasticizer used in the present invention, at least one plasticizer selected from the group consisting of polyester plasticizers and polyalkylene glycol plasticizers is particularly preferable. The plasticizer used in the present invention may be used singly or in a combination of two or more. The amount of the plasticizer added is preferably 0.01 to 30 parts by weight, more preferably 0.1 to 20 parts by weight, and still more preferably 0.5 to 10 parts by weight based on 100 parts by weight of the total amount of the components (A) and (B).

In the present invention, further addition of a hydrolysis inhibitor (D) can suppress reduction by hydrolysis in impact resistance exhibited by the component (B). As the hydrolysis inhibitor, a compound reactive with carboxylic acid and a hydroxyl group as terminal functional groups of the aliphatic polyester resin, for example, a carbodiimide compound, an isocyanate compound, and an oxazoline compound, and the like can be used. In particular, a carbodiimide compound (including a polycarbodiimide compound) is preferable, because such a compound can be melt-kneaded with the polyester resin in a good manner, and hydrolysis can be inhibited by the addition of a small amount of the compound. Examples of a carbodiimide compound having one or more carbodiimide groups in the molecule (including a polycarbodiimide compound) include carbodiimide compounds that can be synthesized by subjecting various polyisocyanates to decarboxylation condensation at a temperature of about 70° C. or higher without a solvent or in an inert solvent, using an organophosphorus compound or an organometal compound as a catalyst. Polycarbodiimides produced by various methods can be used. Basically, polycarbodiimides produced by a conventional method for producing polycarbodiimide (U.S. Pat. No. 2,941,956; JP-B-47-33279; J. Org. Chem. 28, 2069-2075 (1963); Chemical Review, 1981, Vol. 81, No. 4, pp. 619-621) can be used.

Examples of an organic diisocyanate as a raw material for producing a polycarbodiimide include aromatic diisocyanates, aliphatic diisocyanates, alicyclic diisocyanates, and their mixtures. Specific examples include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,14-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate, and 1,3,5-triisopropylbenzene-2,4-diisocyanate.

The amount of the hydrolysis inhibitor (D) is preferably 0.01 to 50 parts by weight based on 100 parts by weight of the aliphatic polyester (A) and the elastic polymer (B) in total. An amount of less than 0.01 parts by weight is not preferable because hydrolysis cannot be inhibited. An amount of more than 50 parts by weight is not preferable because impact resistance is reduced. The amount of the hydrolysis inhibitor (D) is more preferably 0.01 to 30 parts by weight, and still more preferably 0.1 to 30 parts by weight. It is preferable to use the hydrolysis inhibitor (D) in combination with at least one elastic polymer (B) selected from the group consisting of olefin polymers and conjugated diene polymers modified by a compound having one or more polar groups selected from the group consisting of an amino group, an imino group, a hydroxyl group, an epoxy group, a carboxyl group, and an acid anhydride group, because the resulting molded article exhibits a small degree of reduction in impact resistance when hydrolyzed, or exhibits improved impact resistance. This can be found from the ratio of the Izod impact strength S(300) of a test specimen maintained in an atmosphere at a temperature of 60° C. in a humidity of 95% for 300 hours to the Izod impact strength S(0) before the maintenance, S(300)/S(0). S(300)/S(0) is preferably above 0.4, more preferably above 0.9, and particularly preferably above 1.0. Here, the Izod impact strength has been determined according to ASTM D256 as described later.

Any additive can be added to the resin composition of the present invention according to various types of intended use within the contemplation of the present invention. Specific examples of the additive include reinforcements (glass fiber, carbon fiber, metal fiber, natural fiber, and organic fiber), stabilizers (such as hindered phenol, hydroquinone, phosphite and its derivative, resorcinol, salicylate, benzotriazole, and benzophenone), lubricants, release agents (such as montanoic acid and its salt, ester, and half ester, stearyl alcohol, stearamide, and polyethylene wax), colorants including dyes (such as nigrosin) and pigments (such as cadmium sulfide and phthalocyanine), color protection agents (such as phosphite and hypophosphite), flame retardants (such as red phosphorus, phosphate, brominated polystyrene, brominated polyphenylene ether, brominated polycarbonate, magnesium hydroxide, melamine, and cyanuric acid or its salt), conductive agents or colorants (such as carbon black), sliding improvers (such as graphite and fluorine-containing resins), and antistatic agents. These additives may be added singly or in a combination of two or more.

In the composition of the present invention, a polymer other than the components (A) and (B) may be mixed with the components (A) and (B) within the contemplation of the present invention. As the polymer other than the components (A) and (B), at least one of polyolefins such as polyethylene and polypropylene; thermoplastic resins such as polyamide, an acrylic resin, a polyphenylene sulfide resin, a polyether ether ketone resin, polyester, polysulfone, polyphenylene oxide, polyimide, polyetherimide, and polyacetal; thermosetting resins such as a phenol resin, a melamine resin, a silicone resin, and an epoxy resin; and the like may be further added.

The method for producing the composition in the present invention is not specifically limited. Known methods can be used. The composition can be produced using melt kneaders such as an uniaxial extruder, a biaxial extruder, a Banbury mixer, a Brabender kneader, and various kneaders, for example. Generally, the biaxial extruder is preferably a co-rotating extruder rather than a counter-rotating extruder, because the kneading force is stronger. The composition composed of the aliphatic polyester (A) and elastic polymer (B) includes an unmelted mixture of the components (A) and (B). In the present invention, melt-kneading using an extruder is preferable from the viewpoint of productivity. When the crystal nucleator (C) and hydrolysis inhibitor (D) are used, the components (A), (B), (C), and (D) may be melt-kneaded all together. Alternatively, these components may be separately kneaded by, for example, a method of preliminarily kneading the components (B) and (C) and then melt-kneading the mixture with the component (A), or a method of preliminarily kneading the components (A) and (D) and then melt-kneading the mixture with the component (B). Even in the case of separate kneading, these components are preferably continuously kneaded by, for example, kneading the components (B) and (C) first and then side-feeding the component (A), from the viewpoint of productivity. Further, the desired composition may be obtained by preliminarily kneading a part of the component (A) with the component (B) and then adding the remaining component (A) and, as required, the components (C) and (D) to the mixture.

In the molded article of the present invention, the distance between the walls of the dispersed phases composed of the elastic polymer (B) must be less than 5.0 μm. If 5.0 μm or more, impact resistance is inferior. The distance is preferably 1.0 μm or less, more preferably 0.6 μm or less, and particularly preferably less than 0.58 μm. The distance between the walls can be reduced by making the kneading force stronger, increasing the amount of the elastic polymer, or improving affinity of the elastic polymer with the matrix resin by a technique such as modification. However, exhibition of impact resistance while achieving a longer distance between the walls is more easily achieved from the viewpoint of production, can reduce the amount of the elastic polymer, and is preferable for increasing the modulus of elasticity in bending or the like. The dispersed phases include dispersed phases in which other components such as the component (A), an inorganic substance, and a crystal nucleator are enclosed in the component (B). The distance between the walls is determined by a method in which the particle sizes in dispersed phases differentiated in an electron microscopic photograph or the like are measured, and then the distance between the walls is determined by calculation, or a method in which dispersed phases differentiated in an electron microscopic photograph or the like are analyzed using an image analyzer to determine the distance between the walls directly, as described in Wu, S., Polymer, 1985, 26, 1855 or Wu, S., J. Appl. Polym. Sci., 1988, 35, 549. The distance between the walls refers to a distance between the interfaces (walls) between the dispersed phases and the continuous phase, the distance on a straight line connecting between the centers of gravity of the dispersed phases.

The molded article of the present invention can be molded by a known method such as injection molding, sheet molding, blow molding, injection blow molding, inflation molding, extrusion molding, or foaming molding. Forming by fabrication such as pneumatic molding or vacuum molding may also be used. In particular, the molded article is suitably used as an injection-molded article or as a film or a sheet.

The aliphatic polyester resin composition of the present invention has a Charpy impact strength at 25° C. of preferably 15 to 230 kJ/m$^2$ (including "partial break" or "non-break" in ISO 179-1), and more preferably 20 to 230 kJ/m$^2$. The heat distortion temperature under a load of 0.45 MPa is preferably 100 to 170° C., and more preferably 110 to 170° C. In addition, the modulus of elasticity in bending is preferably 3,000 to 20,000 MPa, and more preferably 3,500 to 20,000 MPa.

EXAMPLES

Methods for evaluating physical properties used in the present invention and the following examples will be described first.

Properties of the molded article of the resin composition were evaluated as follows.

(1) Charpy impact strength (with notch): Determined according to the ISO 179 standard.

(2) Izod impact strength (with notch): Determined according to the ASTM D256 standard.

(3) DuPont impact strength: Determined by measuring the conditions causing cracks according to JIS K7211 "Rules for testing impact strength of hard plastics by the falling weight impact test" using a DuPont impact tester. Measurement was conducted using a missile with a radius of 1/16 inch, a spindle with a weight of 200 g, and a sheet with a thickness of 0.1 mm at 25° C. When the sheet was cracked by falling the spindle with a weight of 200 g from a height of 10 cm onto the sheet, the DuPont impact strength was 2 kg·cm.

(4) Modulus of elasticity in bending: Determined according to the ISO 178 standard using a test specimen (80 mm×10 mm×4 mm) at a bending rate of 2 mm/min.

(5) Deflection temperature under load (HDT): Determined according to the ISO 75-2 standard using a test specimen (80 mm×10 mm×4 mm) under conditions in which 0.45 MPa of the bending stress was applied to the test specimen.

Properties of the polylactic acid resin were evaluated as follows.

(6) Molecular Weight

The commercially available standard polystyrene-reduced weight average molecular weight was determined using GPC (GPC-8020 manufactured by Tosoh Corp., RI detection, columns: Shodex K-805 and 801 (connected) manufactured by Showa Denko K.K.) with chloroform as a solvent at a measuring temperature of 40° C.

(7) Optical Purity, Composition Ratio of L-Product/D-Product

The ratio of the L-product to the D-product was determined using HPLC equipped with an optical isomers separating column (LC-10A-VP manufactured by Shimadzu Corp., UV (254 nm) detection), as a sample an aqueous solution obtained by hydrolyzing the polylactic acid resin with a 1N NaOH aqueous solution and then neutralizing the hydrolysis product with aq.HCl.

(8) Distance Between Walls of Dispersed Phases

An extremely thin section of the molded article of the present invention with dispersed phases colored with an appropriate colorant (osmium tetroxide: in the case of using the diene polymer, ruthenium oxide: in the case of using the hydrogenated diene polymer) was prepared. An electron microscopic photograph was taken using a transmission electron microscope H-7100 (manufactured by Hitachi Ltd.). The electron microscopic photograph in which colored dispersed phases were differentiated was then analyzed using an image processing system IP-1000 (manufactured by Asahi Kasei Corp.). Distances between the walls of 400 or more of the dispersed phases were measured to determine the average distance between the walls.

(9) ΔH, Melting Point, Glass Transition Temperature

ΔH, melting point, and glass transition temperature were determined using a differential scanning calorimeter (DSC: Pyris 1 manufactured by PerkinElmer, Inc.) in a nitrogen atmosphere at a temperature variation of 20° C./min.

(10) Tan δ

A test specimen (length: 60 mm, width: 5 mm, thickness: 2 mm) was cut from an injection-molded product. Tan δ of the test specimen was measured using a dynamic viscoelasticity measuring device (DVE-V4 manufactured by Rheology Co.) at a frequency of 10 Hz at a temperature rising rate of 3° C./min.

Properties of the block copolymer used as the conjugated diene polymer were evaluated as follows.

(11) Styrene Content

The styrene content was calculated from the absorption strength at 262 nm using an UV spectrophotometer (Hitachi UV200).

(12) The 1,2-bond content and hydrogenation rate were determined using a nuclear magnetic resonance apparatus (DPX-400 manufactured by Bruker GmbH).

(13) Weight Average Molecular Weight

The weight average molecular weight was determined using GPC (apparatus: LC 10 manufactured by Shimadzu Corp., columns: Shimpac GPC805+GPC804+GPC804+GPC803 manufactured by Shimadzu Corp.) with tetrahydrofuran as a solvent at a measuring temperature of 35° C. The weight average molecular weight was determined by measuring the peak molecular weight in the chromatogram using a calibration curve determined from measurement for commercially available standard polystyrene (prepared using the peak molecular weight of standard polystyrene). When there are two or more peaks in the chromatogram, the weight average molecular weight refers to an average molecular weight determined from the molecular weights of the peaks and the composition ratios of the peaks (determined from the area ratio in each peak of the chromatogram).

As the polylactic acid resin used in the following examples, such a polylactic acid resin (copolymer of L-lactate and D-lactate) as obtained by ring-opening polymerization of lactide using a tin catalyst according to a known publication, for example, Hideto Tsuji, "Polylactide" in Biopolymers Vol. 4 (Wiley-VCH, 2002) pp. 129-178 or National Publication of International Patent Application No. 5-504731 was prepared.

The weight average molecular weight, L-lactic acid content, glass transition temperature, and melting point of (A-1) were respectively 200,000, 98.7 wt %, 57° C., and 169° C.

The weight average molecular weight, L-lactic acid content, glass transition temperature, and melting point of (A-2) were respectively 200,000, 95.9 wt %, 55° C., and 157° C.

The weight average molecular weight, L-lactic acid content, glass transition temperature, and melting point of (A-3) were respectively 180,000, 98.5 wt %, 57° C., and 165° C.

The weight average molecular weight, L-lactic acid content, glass transition temperature, and melting point of (A-4) were respectively 170,000, 98.4 wt %, 57° C., and 164° C.

The weight average molecular weight, L-lactic acid content, glass transition temperature, and melting point of (A-5) were respectively 91,000, 99.5 wt %, 59° C., and 171° C.

The weight average molecular weight, L-lactic acid content, glass transition temperature, and melting point of (A-6) were respectively 68,000, 99.5 wt %, 59° C., and 173° C.

Further, preparation examples of the conjugated diene polymer used in the following examples will be described.

Preparation Example 1

Conjugated Diene Polymer: B-1

An autoclave equipped with a stirrer and a jacket was washed, dried, subjected to replacement of the internal atmosphere with nitrogen, and charged with a cyclohexane solution (concentration: 15 wt %) containing 85 parts by weight of preliminarily purified butadiene. Next, 1.5 mol of tetrahydrofuran based on 1 mol of n-butyl lithium to be used was added, and then the internal temperature of the reaction vessel was maintained at 50° C. 0.1 part by weight of n-butyl lithium as a polymerization initiator based on 100 parts by weight of all monomers used was added. After the reaction was initiated, the internal temperature of the reaction vessel was gradually risen with heating due to polymerization. After termination of the reaction, the reaction vessel was charged with a cyclohexane solution (concentration: 15 wt %) containing 15 parts by weight of preliminarily purified styrene to continue the polymerization. The final internal temperature of the reaction vessel reached about 70° C.

Next, 1,3-dimethyl-2-imidazolidinone as a modifier (hereinafter called "modifier M1") equimolar to n-butyl lithium used for the polymerization was added to and reacted with the living polymer obtained above. Next, methanol was added, and then 0.3 part by weight of octadecyl-3-(3,5-di-t-butyl-4-hydroxyphenyl) propionate based on 100 parts by weight of the polymer was added as a stabilizer.

The resulting modified block copolymer (B-1) had a block structure of polybutadiene-polystyrene, a styrene content of 15 wt %, a 1,2-vinyl bond content of 14%, and a weight average molecular weight of 129,000.

Preparation Example 2

Conjugated Diene Polymer: B-2

The same polymerization as in Preparation Example 1 was conducted, except for not adding a modifier, adding methanol directly, and adding 0.3 part by weight of octadecyl-3-(3,5-di-t-butyl-4-hydroxyphenyl) propionate based on 100 parts by weight of the polymer as a stabilizer.

The resulting unmodified block copolymer (B-2) had a block structure of polybutadiene-polystyrene, and a styrene content, 1,2-vinyl bond content, and weight average molecular weight the same as in the above (B-1).

Preparation Example 3

Conjugated Diene Polymer: B-3

An autoclave equipped with a stirrer and a jacket was washed, dried, subjected to replacement of the internal atmosphere with nitrogen, and charged with a cyclohexane solution (concentration: 20 wt %) containing 12.5 parts by weight of preliminarily purified styrene. Next, 0.1 mol of tetramethylethylenediamine based on 1 mol of n-butyl lithium to be used was added, and then 0.135 part by weight of n-butyl lithium based on 100 parts by weight of all monomers used was added. After polymerization at 70° C. for one hour, a cyclohexane solution (concentration: 20 wt %) containing 75 parts by weight of preliminarily purified butadiene was added, and the mixture was polymerized at 70° C. for one hour. Next, a cyclohexane solution (concentration: 20 wt %) containing 12.5 parts by weight of preliminarily purified styrene was added, and the mixture was polymerized at 70° C. for one hour.

Next, a modifier M1 equimolar to n-butyl lithium used for the polymerization was added to and reacted with the living polymer obtained above. Next, methanol was added, and then 0.3 part by weight of octadecyl-3-(3,5-di-t-butyl-4-hydroxyphenyl) propionate based on 100 parts by weight of the polymer was added as a stabilizer.

The resulting modified block copolymer (B-3) had a block structure of polystyrene-polybutadiene-polystyrene, a styrene content of 25 wt %, a 1,2-vinyl bond content of 14%, and a weight average molecular weight of 110,000.

Preparation Example 4

Conjugated Diene Polymer: B-4

The same polymerization as in Preparation Example 3 was conducted, except for adjusting the amounts of styrene and tetraethylenediamine. A modifier M1 equimolar to n-butyl lithium used for the polymerization was added to and reacted with the resulting living polymer. Next, a reaction vessel with the internal atmosphere replaced with nitrogen was charged with 2 l of dried and purified cyclohexane. 100 mmol of bis(η5-cyclopentadienyl)titanium dichloride was added, and a n-hexane solution containing 200 mmol of trimethylammonium was added while stirring sufficiently. The mixture was reacted at room temperature for about three days to obtain a hydrogenation catalyst. 100 ppm of the hydrogenation catalyst as Ti based on the polymer was added to conduct hydrogenation at a hydrogen pressure of 0.7 MPa at a temperature of 65° C. for one hour.

The resulting modified hydrogenated block copolymer (B-4) had a block structure of polystyrene (9 parts by weight)-hydrogenated polybutadiene (82 parts by weight)-polystyrene (9 parts by weight), a styrene content of 18 wt %, a 1,2-vinyl bond content of 50%, a weight average molecular weight of 110,000, and a hydrogenation rate of 99%.

Preparation Example 5

Conjugated Diene Polymer: B-5

The same preparation as in Preparation Example 4 was conducted, except for adjusting the amounts of styrene and tetraethylenediamine and the hydrogenation time. The resulting modified hydrogenated block copolymer (B-5) had a block structure of polystyrene (15 parts by weight)-hydrogenated polybutadiene (70 parts by weight) -polystyrene (15 parts by weight), a styrene content of 30 wt %, a 1,2-vinyl bond content of 36%, a weight average molecular weight of 120,000, and a hydrogenation rate of 82.5%.

Preparation Example 6

Conjugated Diene Polymer: B-6

The modified hydrogenated block copolymer (B-4) obtained in Preparation Example 4 was blended with maleic anhydride of 1.1 times of the modifier M1 used (on a molar basis), and the blend was melt-kneaded using a 25 mm biaxial extruder (ZSK25 manufactured by Werner & Pfleiderer GmbH) at 230° C. Unreacted maleic anhydride was collected from the vent of the extruder using a vacuum pump to obtain a modified hydrogenated block copolymer (B-6) modified by carboxylic acid.

Preparation Example 7

Conjugated Diene Polymer: B-7

An autoclave equipped with a stirrer and a jacket was washed, dried, subjected to replacement of the internal atmosphere with nitrogen, and charged with a cyclohexane solution (concentration: 20 wt %) containing 15 parts by weight of preliminarily purified styrene. Next, 0.1 mol of tetramethylethylenediamine based on 1 mol of n-butyl lithium to be used was added, and then 0.135 part by weight of n-butyl lithium based on 100 parts by weight of all monomers used was added. After polymerization at 70° C. for one hour, a cyclohexane solution (concentration: 20 wt %) containing 70 parts by weight of preliminarily purified butadiene was added, and the mixture was polymerized at 70° C. for one hour. Next, a cyclohexane solution (concentration: 20 wt %) containing 15 parts by weight of preliminarily purified styrene was added, and the mixture was polymerized at 70° C. for one hour. Next, methanol was added, and then 0.3 part by weight of octadecyl-3-(3,5-di-t-butyl-4-hydroxyphenyl) propionate based on 100 parts by weight of the polymer was added as a stabilizer. The resulting block copolymer had a styrene content of 30 wt %, a block styrene content of 29 wt %, a 1,2-vinyl bond content of 15%, and a weight average molecular weight of 110,000. Next, this polyethylene-polybutadiene-polystyrene block copolymer was epoxidized by a method disclosed in JP-A-2000-219803 to obtain an epoxidized conjugated diene copolymer (B-7). The resulting epoxidized conjugated diene copolymer had an epoxy-modified main chain and an epoxy equivalent of 1,000.

Preparation Example 8

Conjugated Diene Polymer: B-8

The same polymerization as in Preparation Example 3 was conducted, except for not adding a modifier, adding methanol directly, and adding 0.3 part by weight of octadecyl-3-(3,5-di-t-butyl-4-hydroxyphenyl) propionate based on 100 parts by weight of the polymer as a stabilizer.

The resulting modified block copolymer (B-8) had a block structure of polystyrene-polybutadiene-polystyrene, and a styrene content, 1,2-vinyl bond content, and weight average molecular weight the same as in the above (B-3).

Crystal nucleators (C) used in the examples will be shown below.

C-1: Fine powder talc P-3, manufactured by Nippon Talc Co., Ltd., average particle size: 5.1 μm, specific surface area: 8.5 m$^2$/g C-2: Ultrafine powder talc SG-95, manufactured by Nippon Talc Co., Ltd., average particle size: 2.5 μm, specific surface area: 15 m$^2$/g C-2: Ultrafine powder talc SG-2000, manufactured by Nippon Talc Co., Ltd., average particle size: 1.0 μm, specific surface area: 35 m$^2$/g C-3: Colloidal and light calcium carbonate Kalfain 200, manufactured by Maruo Calcium Co., Ltd.

C-4: Dimethyldistearylammonium bentonite Kunipia-D, manufactured by Kunimine Industries Co., Ltd.

A hydrolysis inhibitor (D) used in the examples will be shown below.

D-1: Stabaxol P (a polycarbodiimide compound), manufactured by Rhein Chemie Rheinau GmbH Further, the following additive was used as required. This additive is useful for making the crystal nucleator powder (C) impregnated in a resin pellet to feed the crystal nucleator to an extruder efficiently.

Mineral oil Crystol N 352, manufactured by Exxon Mobil Corp.

Examples 1 to 3, 5 to 9, 11 to 12, Comparative Examples 1 to 5

A formulation as described in Tables 1 and 2 (Examples 1 to 3, 5 to 9, 11 to 12, Comparative Examples 1 to 5) was melt-kneaded using a 25 mm co-rotating biaxial extruder (ZSK25 manufactured by Werner & Pfleiderer GmbH) at 180° C. to obtain a pellet. The pellet was molded into a test specimen at a die temperature of 30° C. using an injection molding machine set at 190° C. The resulting test specimen was heated with hot blast at 120° C. for 30 minutes to evaluate physical properties. The results are shown in Tables 1 and 2.

Examples 4 and 10

A formulation as described in Tables 1 and 2 (Examples 4 and 10) was melt-kneaded using a 30 mm counter-rotating biaxial extruder (AS30 manufactured by Nakatani Kikai Co., Ltd.) at 180° C. to obtain a pellet. The pellet was molded into a test specimen at a die temperature of 30° C. using an injection molding machine set at 190° C. The resulting test specimen was heated with hot blast at 120° C. for 30 minutes to evaluate physical properties. The results are shown in Tables 1 and 2.

Examples 13 to 16, Comparative Example 6

A formulation as described in Table 3 (Examples 13 to 16, Comparative Example 6) was melt-kneaded using a 25 mm co-rotating biaxial extruder (ZSK25 manufactured by Werner & Pfleiderer GmbH) at 180° C. to obtain a pellet. The pellet was molded into a test specimen at a die temperature of 30° C. using an injection molding machine set at 190° C. The resulting test specimen was heated with hot blast at 120° C. for 30 minutes to evaluate physical properties. The results are shown in Table 3.

Examples 17 to 21

A formulation as described in Table 4 (Examples 17 to 21) was melt-kneaded using a 25 mm co-rotating biaxial extruder (ZSK25 manufactured by Werner & Pfleiderer GmbH) at 180° C. to obtain a pellet. The pellet was molded into a test specimen at a die temperature of 30° C. using an injection molding machine set at 190° C. The resulting test specimen was heated with hot blast at 120° C. for 30 minutes to evaluate physical properties. The results are shown in Table 4.

Examples 22 to 24, Comparative Examples 7 and 8

A formulation as described in Table 5 (Examples 22 to 24, Comparative Examples 7 and 8) was melt-kneaded using a 25 mm co-rotating biaxial extruder (ZSK25 manufactured by Werner & Pfleiderer GmbH) at 180° C. to obtain a pellet. The pellet was molded into a test specimen, with the die temperature and holding time set as described in Table 5, using an injection molding machine set at 190° C. A part of the resulting test specimen was heated with hot blast at 120° C. for 30 minutes to evaluate physical properties. The results are shown in Table 5.

Examples 25 to 28, Comparative Example 9

A formulation as described in Table 6 (Examples 25 to 28, Comparative Example 9) was melt-kneaded using a 25 mm co-rotating biaxial extruder (ZSK25 manufactured by Werner & Pfleiderer GmbH) at 180° C. to obtain a pellet. The pellet was molded into a test specimen, with the die temperature and holding time set as described in Table 6, using an injection molding machine set at 190° C. A part of the resulting test specimen was heated with hot blast at 120° C. for 30 minutes to evaluate properties. The results are shown in Table 6.

Examples 29 to 36

A formulation as described in Table 7 (Examples 29 to 36) was melt-kneaded using a 25 mm co-rotating biaxial extruder (ZSK25 manufactured by Werner & Pfleiderer GmbH) at 180° C. to obtain a pellet. The pellet was molded into a test specimen, with the die temperature and holding time set as described in Table 6, using an injection molding machine set at 190° C. A part of the resulting test specimen was heated with hot blast at 120° C. for 30 minutes. The Izod impact strength (S(O)) of the treated test specimen was determined. The test specimen was maintained in an atmosphere at 60° C. in a humidity of 95% for 300 hours to determine the Izod impact strength (S(300)). The results are shown in Table 7.

Example 37, Comparative Example 10

A formulation as described in Table 8 (Example 37, Comparative Example 10) was melt-kneaded using a 25 mm co-rotating biaxial extruder (ZSK25 manufactured by Werner & Pfleiderer GmbH) at 180° C. to obtain a pellet. The pellet was molded into a 0.1 mm-thick sheet using a sheet extruder set at 190° C. A part of the resulting sheet was heated with hot blast at 120° C. for 30 minutes to evaluate physical properties. The results are shown in Table 8.

[Tables 1 to 8]

TABLE 1

| | | | | Example 1 | Example 2 | Example 3 | Example 4 | Example 5 | Example 6 |
|---|---|---|---|---|---|---|---|---|---|
| Composition | Aliphatic polyester (A) | A-1 | Part(s) by weight | 98 | 95 | 90 | 90 | 80 | |
| | | A-2 | | | | | | | 90 |
| | Elastic polymer (B) | B-1 | | 2 | 5 | 10 | 10 | 20 | 10 |
| | | B-2 | | | | | | | |
| Molding conditions | Die temperature | | ° C. | 30 | 30 | 30 | 30 | 30 | 30 |
| | Holding time | | Second(s) | 30 | 30 | 30 | 30 | 30 | 30 |
| Heating treatment | Heating temperature | | ° C. | 120 | 120 | 120 | 120 | 120 | 120 |
| | Heating time | | Minute(s) | 30 | 30 | 30 | 30 | 30 | 30 |
| Evaluation | τ | | μm | 0.94 | 0.61 | 0.53 | 0.58 | 0.39 | 0.53 |
| | ΔH | | J/g | 35 | 35 | 35 | 35 | 35 | 30 |
| | Charpy impact strength | | KJ/m2 | 17.0 | 53 | 86 | 61 | 77 | 28 |
| | Deflection temperature under load | | ° C. | 146.6 | 146.5 | 146.4 | 146.4 | 130.0 | 71.5 |
| | Modulus of elasticity in bending | | MPa | 4320 | 4085 | 3742 | 3738 | 3400 | 3531 |

| | | | | Comparative Example 1 | Comparative Example 2 |
|---|---|---|---|---|---|
| Composition | Aliphatic polyester (A) | A-1 | Part(s) by weight | 95 | 100 |
| | | A-2 | | | |

TABLE 1-continued

|  |  |  |  |  |  |
|---|---|---|---|---|---|
|  | Elastic polymer (B) | B-1 B-2 |  |  | 5 |
| Molding conditions |  | Die temperature Holding time | °C. Second(s) | 30 30 | 30 30 |
| Heating treatment |  | Heating temperature Heating time | °C. Minute(s) | 120 30 | 120 30 |
| Evaluation |  | τ ΔH Charpy impact strength Deflection temperature under load Modulus of elasticity in bending | μm J/g KJ/m2 °C. MPa | 5 or more 35 5 142.0 4070 | — 35 2.0 123.5 4291 |

TABLE 2

|  |  |  |  | Comparative Example 3 | Example 8 | Example 9 | Example 10 | Example 11 |
|---|---|---|---|---|---|---|---|---|
| Composition | Aliphatic polyester (A) | A-1 A-2 | Part(s) by weight | 98 | 95 | 90 | 90 | 80 |
|  | Elastic polymer (B) | B-1 B-2 |  | 2 | 5 | 10 | 10 | 20 |
| Molding conditions |  | Die temperature Holding time | °C. Second(s) | 30 30 | 60 30 | 60 30 | 60 30 | 60 30 |
| Heating treatment |  | Heating temperature Heating time | °C. Minute(s) | — — | — — | — — | — — | — — |
| Evaluation |  | τ ΔH Charpy impact strength Deflection temperature under load Modulus of elasticity in bending | μm J/g KJ/m2 °C. MPa | 0.94 Less than 5 2.4 57.2 3170 | 0.61 8 3.4 57.1 3060 | 0.53 8 23 57 2850 | 0.58 8 9.2 56.9 2850 | 0.39 8 7.2 54.0 2120 |

|  |  |  |  | Example 12 | Comparative Example 4 | Comparative Example 5 |
|---|---|---|---|---|---|---|
| Composition | Aliphatic polyester (A) | A-1 A-2 | Part(s) by weight | 90 |  90 | 100 |
|  | Elastic polymer (B) | B-1 B-2 |  | 10 | 10 |  |
| Molding conditions |  | Die temperature Holding time | °C. Second(s) | 60 30 | 60 30 | 60 30 |
| Heating treatment |  | Heating temperature Heating time | °C. Minute(s) | — — | — — | — — |
| Evaluation |  | τ ΔH Charpy impact strength Deflection temperature under load Modulus of elasticity in bending | μm J/g KJ/m2 °C. MPa | 0.53 6 19 54.1 2750 | 5 or more 8 1.9 56.4 2830 | — 8 1.8 56.9 3293 |

TABLE 3

|  |  |  |  | Example 13 | Example 14 | Example 15 | Example 16 | Comparative Example 6 |
|---|---|---|---|---|---|---|---|---|
| Composition | Aliphatic polyester (A) | A-1 | Part(s) by weight | 85 | 85 | 85 | 85 | 85 |
|  | Elastic polymer (B) | B-3 |  | 15 |  |  |  |  |
|  |  | B-4 |  |  | 15 |  |  |  |
|  |  | B-5 |  |  |  | 15 |  |  |
|  |  | B-6 |  |  |  |  | 15 |  |
|  |  | B-7 |  |  |  |  |  | 15 |
| Molding conditions | Die temperature |  | °C. | 30 | 30 | 30 | 30 | 30 |
|  | Holding time |  | Second(s) | 30 | 30 | 30 | 30 | 30 |
| Heating treatment | Heating temperature |  | °C. | 120 | 120 | 120 | 120 | 120 |
|  | Heating time |  | Minute(s) | 30 | 30 | 30 | 30 | 30 |
| Evaluation | τ |  | μm | 0.6 or less | 0.6 or less | 0.6 or less | 0.6 or less | 5μ or more |
|  | ΔH |  | J/g | 35 | 35 | 35 | 35 | 35 |
|  | Charpy impact strength |  | KJ/m2 | 75 | 89 | 76 | 34 | 3.3 |
|  | Deflection temperature under load |  | °C. | 143.0 | 147.5 | 147.6 | 142.1 | 72 |
|  | Modulus of elasticity in bending |  | MPa | 3610 | 3790 | 3800 | 3600 | 2500 |

TABLE 4

|  |  |  |  | Example 17 | Example 18 | Example 19 | Example 20 | Example 21 |
|---|---|---|---|---|---|---|---|---|
| Composition | Aliphatic polyester (A) | A-3 | Part(s) by weight | 90 | 90 | 90 | 90 | 90 |
|  | Elastic polymer (B) | B-1 |  | 10 | 10 | 10 | 10 | 10 |
|  | Crystal nucleator (C) | C-1 |  | 5 |  |  |  |  |
|  |  | C-2 |  |  | 5 |  |  |  |
|  |  | C-3 |  |  |  | 5 |  |  |
|  |  | C-4 |  |  |  |  | 5 |  |
|  |  | C-5 |  |  |  |  |  | 5 |
|  | Mineral oil |  |  | 0.1 | 0.1 | 0.1 | 0.1 | 0.1 |
| Molding conditions | Die temperature |  | °C. | 30 | 30 | 30 | 30 | 30 |
|  | Holding time |  | Second(s) | 25 | 25 | 25 | 25 | 25 |
| Heating treatment | Heating temperature |  | °C. | 120 | 120 | 120 | 120 | 120 |
|  | Heating time |  | Minute(s) | 30 | 30 | 30 | 30 | 30 |
| Evaluation | τ |  | μm | 0.6 or less | 0.6 or less | 0.6 or less | 0.6 or less | 0.6 or less |
|  | ΔH |  | J/g | 36 | 35 | 35 | 37 | 37 |
|  | Charpy impact strength |  | KJ/m2 | 46 | 54 | 61 | 41 | 23 |
|  | Deflection temperature under load |  | °C. | 3700 | 3840 | 4010 | 3840 | 3970 |
|  | Modulus of elasticity in bending |  | MPa | 145.8 | 142.6 | 147.0 | 136.7 | 127.0 |

TABLE 5

|  |  |  |  | Example 22 | Example 23 | Comparative Example 7 | Comparative Example 8 | Example 24 |
|---|---|---|---|---|---|---|---|---|
| Composition | Aliphatic polyester (A) | A-3 | Part(s) by weight | 90 | 90 | 100 | 90 | 90 |
|  | Elastic polymer (B) | B-1 |  | 10 | 10 |  | 10 | 10 |
|  | Crystal nucleator (C) | C-1 |  | 5 | 5 |  | 5 | 5 |
|  | Mineral oil |  |  | 0.1 | 0.1 | 0.1 | 0.1 | 0.1 |
| Molding conditions | Die temperature |  | °C. | 30 | 110 | 30 | 30 | 110 |
|  | Holding time |  | Second(s) | 25 | 900 | 25 | 25 | 120 |
| Heating treatment | Heating temperature |  | °C. | 120 | — | 120 | — | — |
|  | Heating time |  | Minute(s) | 30 | — | 30 | — | — |
| Evaluation | τ |  | μm | 0.6 or less | 0.6 or less | 0.6 or less | 0.6 or less | 0.6 or less |
|  | ΔH |  | J/g | 35.8 | 36.0 | 37.0 | Less than 5 | 36.1 |
|  | ΔH1/ΔH |  |  | 0.294 | 0.32 | Less than 0.4 | 0.4 or more | 0.409 |
|  | Charpy impact strength |  | KJ/m2 | 46 | 32 | 2.2 | 14 | 10.4 |
|  | Deflection temperature under load |  | °C. | 145.8 | 125.0 | 123.5 | 54.9 | 81 |

TABLE 6

|  |  |  |  | Example 25 | Example 26 | Example 27 | Example 28 | Comparative Example 9 |
|---|---|---|---|---|---|---|---|---|
| Composition | Aliphatic polyester (A) | A-4 | Part(s) by weight | 90 | 90 | 90 | 90 | 90 |
|  | Elastic polymer (B) | B-1 |  | 10 | 10 | 10 | 10 | 10 |
|  | Crystal nucleator (C) | C-1 |  | 5 | 5 | 5 | 5 | 5 |
|  | Mineral oil |  |  | 0.1 | 0.1 | 0.1 | 0.1 | 0.1 |
| Molding conditions | Die temperature |  | °C. | 30 | 100 | 110 | 116 | 30 |
|  | Holding time |  | Second(s) | 30 | 160 | 160 | 160 | 30 |
| Heating treatment | Heating temperature |  | °C. | 120 | — | — | — | — |
|  | Heating time |  | Minute(s) | 30 | — | — | — | — |
| Evaluation | τ |  | μm | 0.6 or less | 0.6 or less | 0.6 or less | 0.6 or less | 0.6 or less |
|  | ΔH |  | J/g | 35 | 35 | 35 | 35 | Less than 5 |
|  | Tan δ (80)/Tan δ (65) |  |  | 3.36 | 1.99 | 1.78 | 1.66 | 0.98 |
|  | Izod impact strength |  | J/m | 372 | 274 | 137 | 118 | 98 |

TABLE 7

|  |  |  |  | Example 29 | Example 30 | Example 31 | Example 32 | Example 33 |
|---|---|---|---|---|---|---|---|---|
| Composition | Aliphatic polyester (A) | A-5 | Part(s) by weight | 90 | 90 |  |  | 90 |
|  |  | A-6 |  |  |  | 90 | 90 |  |
|  | Elastic polymer (B) | B-3 |  | 10 | 10 | 10 | 10 |  |
|  |  | B-8 |  |  |  |  |  | 10 |
|  | Crystal nucleator (C) | C-1 |  | 5 | 5 | 5 | 5 | 5 |
|  | Hydrolysis inhibitor (D) | D-1 |  | 1 | 1 | 1 | 1 | 1 |
|  | Mineral oil |  |  | 0.1 | 0.1 | 0.1 | 0.1 | 0.1 |
| Molding conditions | Die temperature |  | °C. | 30 | 100 | 30 | 100 | 30 |
|  | Holding time |  | Second(s) | 30 | 60 | 30 | 60 | 30 |
| Heating treatment | Heating temperature |  | °C. | 120 | — | 120 | — | 120 |
|  | Heating time |  | Minute(s) | 30 | — | 30 | — | 30 |
| Evaluation | τ |  | μm | 0.6 or less | 0.6 or less | 0.6 or less | 0.6 or less | Less than 5.0 |
|  | ΔH |  | J/g | 38 | 38 | 40 | 40 | 38 |
|  | Izod impact strength 0 hours S(0) |  | J/m | 19.2 | 16.1 | 12.6 | 12.2 | 7.0 |

TABLE 7-continued

|  |  |  |  |  |  |  |  |
|---|---|---|---|---|---|---|---|
| 300 hour S(300) | J/m | 17.9 | 21.1 | 11.9 | 15.6 | 2.9 |
| S(300)/S(0) |  | 0.93 | 1.31 | 0.94 | 1.28 | 0.41 |

|  |  |  |  | Example 34 | Example 35 | Example 36 |
|---|---|---|---|---|---|---|
| Composition | Aliphatic polyester (A) | A-5 | Part(s) by weight | 90 | 90 | 90 |
|  |  | A-6 |  |  |  |  |
|  | Elastic polymer (B) | B-3 |  |  | 10 | 10 |
|  |  | B-8 |  | 10 |  |  |
|  | Crystal nucleate (C) | C-1 |  | 5 | 5 | 5 |
|  | Hydrolysis inhibitor (D) | D-1 |  | 1 | 0 | 0 |
|  | Mineral oil |  |  | 0.1 | 0.1 | 0.1 |
| Molding conditions | Die temperature |  | ° C. | 100 | 30 | 100 |
|  | Holding time |  | Second(s) | 60 | 30 | 60 |
| Heating treatment | Heating temperature |  | ° C. | — | 120 | — |
|  | Heating time |  | Minute(s) | — | 30 | — |
| Evaluation | τ |  | μm | Less than 5.0 | 0.6 or less | 0.6 or less |
|  | ΔH |  | J/g | 38 | 38 | 38 |
|  | Izod impact strength 0 hours S(0) |  | J/m | 6.5 | 13.7 | 19.6 |
|  | 300 hour S(300) |  | J/m | 2.9 | 4.1 | 8.1 |
|  | S(300)/S(0) |  |  | 0.45 | 0.30 | 0.41 |

TABLE 8

|  |  |  |  | Example 37 | Comparative Example 10 |
|---|---|---|---|---|---|
| Composition | Aliphatic polyester (A) | A-3 | Part(s) by weight | 90 | 90 |
|  | Elastic polymer (B) | B-1 |  | 10 | 10 |
|  | Crystal nucleator (C) | C-1 |  | 5 | 5 |
|  | Mineral oil |  |  | 0.1 | 0.1 |
| Heating treatment | Heating temperature |  | ° C. | 120 | — |
|  | Heating time |  | Minute(s) | 30 | — |
| Evaluation | τ |  | μm | 0.6 or less | 0.6 or less |
|  | ΔH |  | J/g | 35.1 | Less than 5 |
|  | DuPont impact strength |  | Kg·cm | 5.0 | 2.0 |

The invention claimed is:

1. A molded article obtained from an aliphatic polyester resin composition comprising 60 to 99.9 parts by weight of at least one polylactic acid resin (A) and 0.1 to 40 parts by weight of at least one elastic polymer (B), provided that the total amount of the components (A) and (B) is 100 parts by weight,
wherein the aliphatic polyester component in the molded article has an enthalpy of crystal fusion ΔH determined using a differential scanning calorimeter of 5 J/g or more,
wherein the elastic polymer (B) is selected from the group consisting of
(i) an olefin polymer modified by a compound having one or more polar groups selected from the group consisting of an amino group, an imino group, a hydroxyl group, an epoxy group, a carboxyl group, and an acid anhydride group,
(ii) a conjugated diene polymer modified by a compound having one or more polar groups selected from the group consisting of an amino group, an imino group, a hydroxyl group, an epoxy group, a carboxyl group, and an acid anhyride group, and
(iii) a mixture of the modified olefin polymer (i) and the modified conjugated diene polymer (ii) and
wherein the molded article has a continuous phase composed of the aliphatic polyester (A) and dispersed phases composed of the elastic polymer (B), and the distance τ between the walls of the dispersed phases is less than 5.0 μm.

2. The molded article according to claim 1, wherein the aliphatic polyester component in the molded article has an enthalpy of crystal fusion ΔH determined using a differential scanning calorimeter of 25 J/g or more.

3. The molded article according to claim 1, wherein the aliphatic polyester (A) is a polylactic acid resin, and the relation between the L-lactic acid unit and the D-lactic acid unit in the polylactic acid resin satisfies the following formula (1) or (2):

$$[\text{Weight of L-lactic acid unit/weight of L-lactic acid unit} + \text{weight of D-lactic acid unit}] \times 100 > 96 \text{ wt\%} \quad (1)$$

or $$[\text{Weight of D-lactic acid unit/(weight of L-lactic acid unit} + \text{weight of D-lactic acid unit})] \times 100 > 96 \text{ wt\%} \quad (2).$$

4. The molded article according to claim 1, comprising 0.01 to 50 parts by weight of at least one crystal nucleator (C) based on 100 parts by weight of the aliphatic polyester (A) and the elastic polymer (B) in total;.

5. The molded article according to claim 4, wherein the crystal nucleator (C) has an average particle size of 0.001 to 3.0μm and a specific surface area of 15 to 1,000 m²/g.

6. The molded article according to claim 1, comprising 0.01 to 50 parts by weight of at least one hydrolysis inhibitor (D) based on 100 parts by weight of the aliphatic polyester (A) and the elastic polymer (B) in total.

7. The molded article according to claim 6, wherein the hydrolysis inhibitor (D) is a polycarbodiimide compound.

8. The molded article according to claim 1, wherein, in the crystal fusion behavior based on the aliphatic polyester (A), the relation between the enthalpy of fusion ΔH1 at a peak temperature T1 or higher and the entire enthalpy of crystal fusion ΔH satisfies the following formula (3):

$$\Delta H_1/\Delta H > 0.40 \quad (3).$$

9. The molded article according to claim 1, wherein the relation between Tan δ at 80° C. and Tan δ at 65° c. satisfies the following formula (4):

$$\text{Tan } \delta (80)/\text{Tan } \delta (65) > 1.00 \quad (4),$$

wherein Tan δ (80) refers to Tan δ at 80° c. of the article, and Tan δ (65) refers to Tan δ at 65° C. of the molded article.

10. The molded article according to claim 6, wherein the ratio of the Izod impact strength S(300) determined according to ASTM D256 of a test specimen maintained in an atmosphere at a temperature of 60° C. in a humidity of 95% for 300 hours to the Izod impact strength S(0) determined according to ASTM D256 before the maintenance, S(300)IS(0), exceeds 0.4.

11. An aliphatic polyester resin composition comprising 60 to 99.9 parts by weight of at least one polylactic acid resin (A) and 0.1 to 40 parts by weight of at least one elastic polymer (B),
wherein the elastic polymer (B) is selected from the group consisting of
(i) an olefin polymer modified by a compound having one or more polar groups selected from the group consisting of an amino group, an imino group, a ahydroxyl group, an epoxy group, a carboxyl group, and an acid anhydride group;
(ii) a conjugated diene polymer modified by a compound having one or more polar groups selected from the group consisting of an amino group, an imino group, a hydroxyl group, an epoxy group, a carboxyl group, and an acid anhydride group; and
(iii) a mixture of the modified olefin polymer (i) and the modified conjugated diene polymer (ii).

12. The aliphatic polyester resin composition according to claim 11, wherein the aliphatic polyester (A) is a polylactic acid resin, and the relation between the L-lactic acid unit and the D-lactic acid unit in the polylactic acid resin satisfies the following formula (5) or (6):

[Weight of L-lactic acid unit l(weight of L-lactic acid unit +weight of D-Iactic acid unit)]×100 >96 wt % (5) or

[Weight of D-lactic acid unit l(weight of L-lactic acid unit +weight of D-lactic acid unit)]×100 >96 wt % (6).

13. The aliphatic polyester resin composition according to claim 11, wherein the olefin polymer and/or the conjugated diene polymer constituting the elastic polymer (B) have a polymer terminal modified by a compound having one or more polar groups selected from the group consisting of an amino group, an imino group, a hydroxyl group, an epoxy group, a carboxyl group, and an acid anhydride group.

14. The aliphatic polyester resin composition according to claim 11, wherein the elastic polymer (B) comprises at least one polymer selected from the group consisting of a modified conjugated diene homopolymer, a copolymer of a conjugated diene and a vinyl aromatic hydrocarbon, and hydrogenated products of these polymers.

15. The aliphatic polyester resin composition according to claim 11, wherein the elastic polymer (B) comprises a modified block copolymer comprising at least one block mainly composed of a vinyl aromatic hydrocarbon and at least one block mainly composed of a conjugated diene and/or its hydrogenated product, and the composition has a vinyl aromatic hydrocarbon content of 50 wt % or less.

16. The aliphatic polyester resin composition according to claim 11, wherein the elastic polymer (B) is modified by a modifier having an imidazolidinone backbone.

17. The aliphatic polyester resin composition according to claim 11, comprising 0.01 to 50 parts by weight of at least one crystal nucleator (C) based on 100 parts by weight of the aliphatic polyester (A) and the elastic polymer (B) in total.

18. The aliphatic polyester resin composition according to claim 17, wherein the crystal nucleator (C) has an average particle size of 0.001 to 3.0 μm and a specific surface area of 15 to 1,000 M²/g.

19. The aliphatic polyester resin composition according to claim 11, comprising 0.01 to 50 parts by weight of at least one hydrolysis inhibitor (D) based on 100 parts by weight of the aliphatic polyester (A) and the elastic polymer (B) in total.

20. The aliphatic polyester resin composition according to claim 19, wherein the hydrolysis inhibitor (D) is a polycarbodiimide compound.

21. The aliphatic polyester resin composition according to claim 19, wherein the ratio of the Izod impact strength S(300) determined according to ASTM D256 of a test specimen maintained in an atmosphere at a temperature of 60° C. in a humidity of 95% for 300 hours to the Izod impact strength S(0) determined according to ASTM D256 before the maintenance, S(300)IS(0), exceeds 0.4.

* * * * *

UNITED STATES PATENT AND TRADEMARK OFFICE
CERTIFICATE OF CORRECTION

PATENT NO. : 7,514,503 B2
APPLICATION NO. : 10/959178
DATED : April 7, 2009
INVENTOR(S) : Motonori Nakamichi et al.

It is certified that error appears in the above-identified patent and that said Letters Patent is hereby corrected as shown below:

\* On the title page, item (57), line 12, "T between" should read --τ between--.

\* In claim 3, column 34, line 43, "unit/weight" should read --unit/(weight--.

\* In claim 4, column 34, line 54, "total;." should read --total.--.

\* In claim 5, column 34, line 57, "3.0μm" should read --3.0 μm--.

\* In claim 8, column 35, line 3, "$\Delta H1/\Delta H>0.40$" should read --$\Delta H1/\Delta H<0.40$--.

\* In claim 9, column 35, line 6, "65° c." should read --65° C.--.

\* In claim 9, column 35, line 9, "80° c. of the article," should read --80° C. of the molded article--.

\* In claim 10, column 35, line 16, "S(300)IS(0)," should read --S(300)/S(0),--.

\* In claim 11, column 35, line 26, "a ahydroxyl" should read --a hydroxyl--.

\* In claim 12, column 35, line 42, "unit I(weight" should read --unit/(weight--.

\* In claim 12, column 35, line 43, "D-lactic" should read --D-lactic--.

\* In claim 12, column 35, line 45, "unit I(weight" should read --unit/(weight--.

UNITED STATES PATENT AND TRADEMARK OFFICE
CERTIFICATE OF CORRECTION

PATENT NO. : 7,514,503 B2
APPLICATION NO. : 10/959178
DATED : April 7, 2009
INVENTOR(S) : Motonori Nakamichi et al.

It is certified that error appears in the above-identified patent and that said Letters Patent is hereby corrected as shown below:

\* In claim 21, column 36, line 45, "S(300)IS(0)," should read --S(300)/S(0),--.

Signed and Sealed this

First Day of September, 2009

David J. Kappos
*Director of the United States Patent and Trademark Office*